(12) United States Patent
Cariou et al.

(10) Patent No.: US 11,438,104 B2
(45) Date of Patent: Sep. 6, 2022

(54) EXTREMELY HIGH THROUGHPUT HYBRID AUTOMATIC REPEAT REQUEST

(71) Applicant: Intel Corporation, Santa Clara, CA (US)

(72) Inventors: Laurent Cariou, Portland, OR (US); Xiaogang Chen, Portland, OR (US); Po-Kai Huang, San Jose, CA (US); Javier Perez-Ramirez, North Plains, OR (US); Shahrnaz Azizi, Cupertino, CA (US); Ravikumar Balakrishnan, Beaverton, OR (US); Daniel Bravo, Portland, OR (US); Feng Jiang, Santa Clara, CA (US); Thomas J. Kenney, Portland, OR (US); Qinghua Li, San Ramon, CA (US); Robert Stacey, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/729,137

(22) Filed: Dec. 27, 2019

(65) Prior Publication Data

US 2020/0137827 A1    Apr. 30, 2020

Related U.S. Application Data

(60) Provisional application No. 62/785,790, filed on Dec. 28, 2018.

(51) Int. Cl.
*H04L 1/18* (2006.01)
*H04W 80/02* (2009.01)
*H04L 1/16* (2006.01)
*H04W 84/12* (2009.01)

(52) U.S. Cl.
CPC .......... *H04L 1/1819* (2013.01); *H04L 1/1614* (2013.01); *H04L 1/1621* (2013.01); *H04W 80/02* (2013.01); *H04W 84/12* (2013.01)

(58) Field of Classification Search
CPC ... H04L 1/1819; H04L 1/1614; H04L 1/1621; H04W 80/02; H04W 84/12
See application file for complete search history.

(56) References Cited

U.S. PATENT DOCUMENTS

2020/0112878 A1* 4/2020 Liu .................. H04L 1/1845
2021/0075559 A1* 3/2021 Epstein ............ H04L 1/1621

* cited by examiner

*Primary Examiner* — Mandish K Randhawa
(74) *Attorney, Agent, or Firm* — Eversheds Sutherland (US) LLP

(57) ABSTRACT

This disclosure describes systems, methods, and devices related to extremely high throughput (EHT) multiuser hybrid automatic repeat request (HARQ). A device may determine one or more medium access control (MAC) protocol data unit (MPDUs) to be sent to a first station device of one or more station devices, wherein the one or more MAC protocol data units (MPDUs) comprise a first MPDU. The device may segment the first MPDU into a plurality of segments, wherein the one or more segments include a first segment and a second segment. The device may cause to send the plurality of segments to the first station device. The device may identify a feedback frame received from the first station device, wherein the feedback frame comprises error information associated with the plurality of segments. The device may cause to retransmit at least one of the plurality of segments based on the error information.

20 Claims, 21 Drawing Sheets

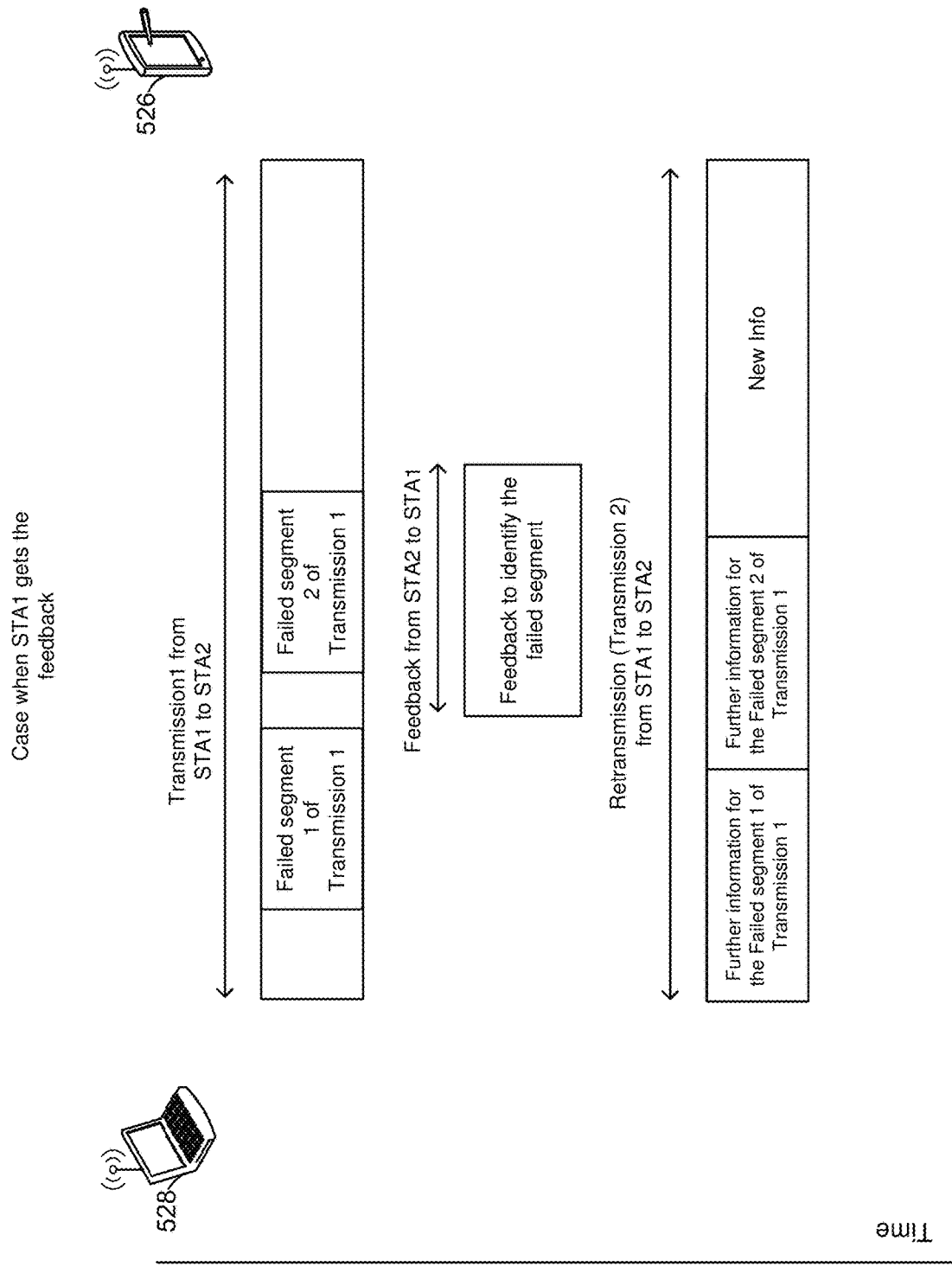

EXTREMELY HIGH THROUGHPUT HYBRID AUTOMATIC REPEAT REQUEST

CROSS-REFERENCE TO RELATED APPLICATION(S)

This application claims the benefit of U.S. Provisional Application No. 62/785,790, filed Dec. 28, 2018, the disclosure of which is incorporated herein by reference as if set forth in full.

TECHNICAL FIELD

This disclosure generally relates to systems and methods for wireless communications and, more particularly, to extremely high throughput (EHT) hybrid automatic repeat request (HARQ).

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

BRIEF DESCRIPTION OF THE DRAWINGS

FIGS. 4, 5A-5B, and 6 depict illustrative schematic diagrams for HARQ retransmission, in accordance with one or more example embodiments of the present disclosure.

Figure 1:
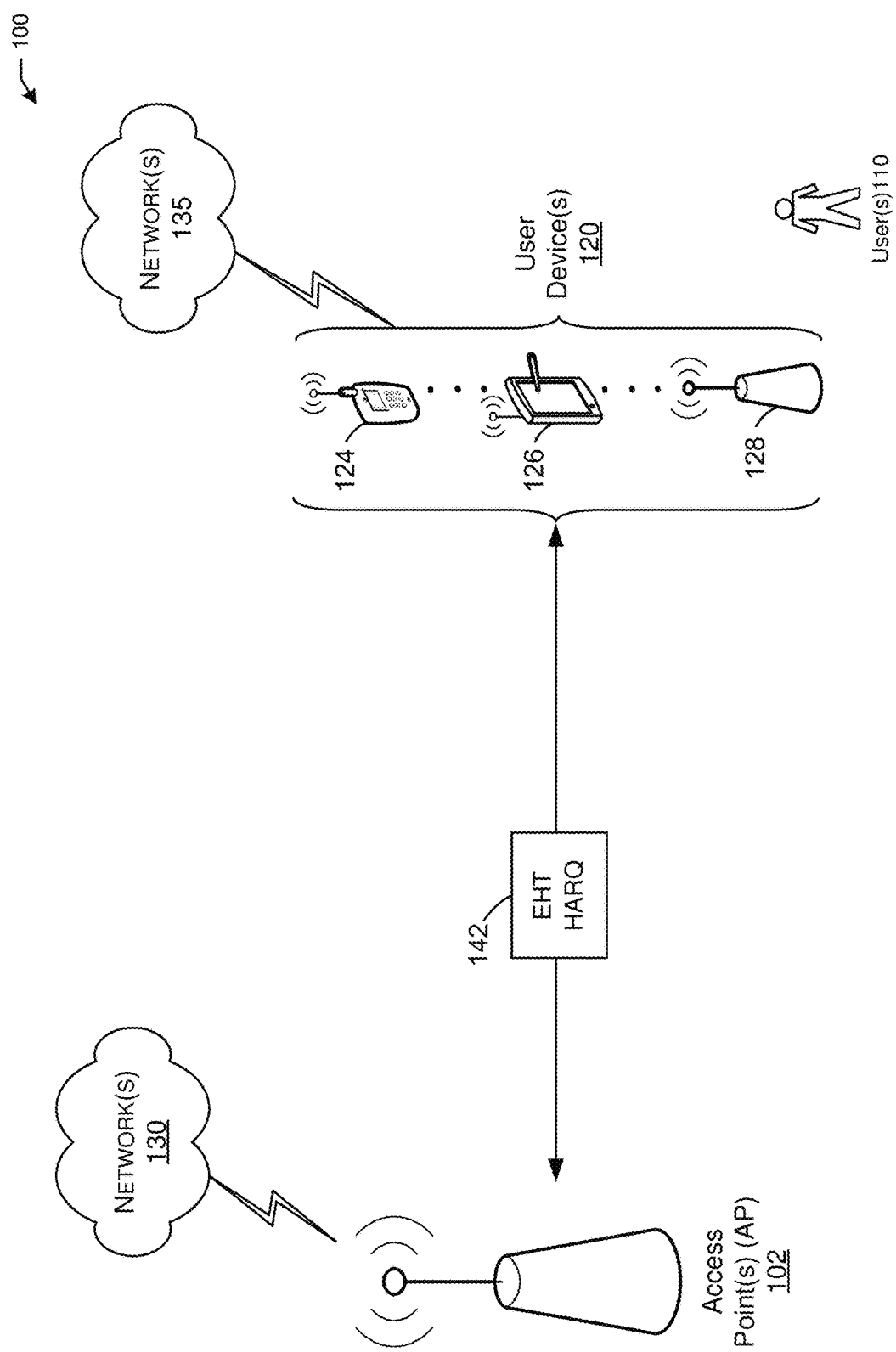
FIG. 1 is a network diagram illustrating an example network environment for extremely high throughput (EHT) hybrid automatic repeat request (HARQ), in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in or substituted for, those of other embodiments. Embodiments set forth in the claims encompass all available equivalents of those claims.

There is currently no hybrid automatic repeat request (HARQ) for physical layer (PHY) in 802.11 systems. HARQ may use packet segmentation for single user (SU) and multi-user (MU), validated using cyclic redundancy code (CRC). However, HARQ is becoming an important feature of extremely high throughput (EHT). The basic idea of HARQ is that if part of the transmission from a first station device (STA1) to a second station device (STA2) cannot be decoded, then STA2 can provide some feedback to indicate the part that cannot be decoded. After STA2 provides the feedback, STA1 can then retransmit further information to STA2 to help STA2 decode the failed segment. There are different flavors for the above procedure in different steps, which are currently the main debate for the exact scheme. For the feedback, the STA can identify the failed segment with a granularity of medium access control (MAC) protocol data unit (MPDU) or granularity of low-density parity-check (LDPC) codeword. For the retransmission of further information, the exact failed segment is retransmitted (chase combining), or additional information for the failed segment is retransmitted (incremental redundancy).

Operation of retransmission for STA1 and STA2 is an important part of the HARQ design and an important requirement for HARQ is for STA1 to understand the failed segment that is current stored in STA2 so that STA1 can retransmit the corresponding information properly.

First, if STA2 stores the failed segment, and STA1 receives the feedback from STA2, then STA1 can always retransmit the information related to the failed segment of the previous transmission, and STA2 can then interpret the structure of the failed segment based on the previous transmission. However, STA2 may not know if STA1 received the feedback or not. If STA1 receives the feedback, then STA1 will retransmit based on the feedback. If STA1 does not receive the feedback, STA1 cannot differentiate the following two cases:

(1) STA2 decodes the preamble and does not decode some or all of the PSDU transmission, and stores the failed segment of the PSDU.

(2) STA2 does not decode the preamble and does not store anything at all.

As a result, STA1 will retransmit the whole thing again. Now, for STA2, it then cannot assume that the retransmission will always start with the failed segment and follow by new information.

Second, the existing ARQ scheme using block acknowledgment (BA) uses frames like block acknowledgment request (BAR) or multi-user block acknowledgment request (MU-BAR) to solicit block acknowledgment (BA) from other STAs. As a result, the BA will not return as an immediate response to the transmission. However, currently, there is no discussion on enabling this sequence to return HARQ feedback.

Third, it is possible that STA2 does not decode the preamble of the transmission and is still requested for feedback. In this case, STA2 does not store any failed segment at all, and STA1 also cannot tell the difference.

There has not been a discussion about how STA2 understands the failed pattern structure for retransmission. There has not been a discussion about how STA1 solicits HARQ feedback from STA2 without using immediate response nor any discussion about how STA1 understands the status of STA2 for retransmission. Also, there has not been a discussion about how STA2 understands the failed pattern structure for retransmission or how STA1 solicits HARQ feedback from STA2 without using immediate response or how STA1 understands the status of STA2 for retransmission.

Operating under HARQ, a transmitter sends a succession of HARQ segments, that are made of one or several low-density parity-check (LDPC) codewords. On the receiver side, the successfully received HARQ segments are stored in the form of decoded bits. The log-likelihood ratios (LLRs) of the unsuccessfully received HARQ segments are stored at the receiver. An LLR is a measure of how likely a bit is a "0" or a "1". Only the unsuccessfully received HARQ segments are retransmitted and are combined at the LDPC decoder level in order to improve detection. HARQ can have a strong impact on the architecture and the intention is to try and have a design that is as simple as possible. Scrambling is currently performed before the channel coding at the transmitter side, and descrambling is performed after the LDPC decoder at the receiver side. This causes complexity in combining different segments that have been received with different scrambling sequences. One solution is that the receiver keeps track of the scrambling pattern applied in each segment in order to ensure a compatible combination.

Example embodiments of the present disclosure relate to systems, methods, and devices for HARQ using hybrid PHY/MAC block ACK for Next-generation Wi-Fi extreme high throughput (EHT).

In one or more embodiments, an EHT HARQ system may facilitate efficient methods for performing HARQ using segmented transmission of a data packet. The PHY transmission is broken down into segments where decoding is done per segment. The transmitter selectively retransmits the segments that were incorrectly received while new segments can be transmitted along with the retransmitted segments.

In one or more embodiments, an EHT HARQ system may detect the presence of error after segment decoding at the PHY layer when using low-density parity-check (LDPC).

In one or more embodiments, an EHT HARQ system may facilitate using HARQ in 802.11 systems for single user (SU) and multi-user (MU). Unlike in traditional Wi-Fi operations, a physical layer (PHY) cyclic redundancy code (CRC) was appended to MPDUs before scrambling and encoding at the PHY layer to enable HARQ. During HARQ operations, retransmissions of segmented PHY packets were processed using different types of HARQ techniques.

In one or more embodiments, an EHT HARQ system may facilitate a mechanism that requires no CRC.

In one or more embodiments, an EHT HARQ system may facilitate combining retransmitted segments with new segments within the same PPDU introducing minimal changes to current standards.

In one or more embodiments, MAC packets may be encoded and separated into segments. Each segment may be aggregated to form a HARQ PPDU. This may allow the operation of HARQ in different fragments of the PPDU, which may result in lower processing latencies.

Currently, there are no current methods to support Hybrid ARQ for Wi-Fi systems. By adding the support for HARQ as a feature for Wi-Fi systems, any Wi-Fi AP and Clients (high-end clients, especially) can benefit greatly from improved link reliability and throughput increase and therefore gain in terms of the Quality of Experience of the end-users. In addition, the proposed HARQ methods for uplink communications can be easily adopted by existing 802.11 ax or beyond APs by leveraging the relatively larger compute and memory resources available compared to stations.

Example embodiments of the present disclosure relate to systems, methods, and devices for hybrid automatic repeat request (HARQ) retransmission.

In one or more embodiments, a HARQ retransmission system may facilitate the following to enable efficient HARQ retransmission as follows:

STA1 will indicate if HARQ is going to be used, and STA2 can then decide whether to store the failed segment or not.

Design frame to allow STA1 to solicit HARQ feedback, which is not an immediate response.

STA2 will indicate if a failed segment is stored, and STA1 can then decide whether to use HARQ or not.

Design rule for STA1 and STA2 to understand the retransmission pattern of a failed segment.

With an indication of HARQ usage, HARQ can be used optionally since HARQ may not be suitable for all situations.

With a frame for soliciting HARQ feedback, an existing sequence for soliciting feedback that is not an immediate response can be used.

With an indication of a stored failed segment, STA1 can safely retransmit with the right HARQ information.

Example embodiments of the present disclosure relate to systems, methods, and devices for HARQ scrambling.

In one embodiment, an HARQ scrambling system may change the physical layer (PHY) transmitter block diagram and perform scrambling after low-density parity-check (LDPC) encoding.

In one embodiment, an HARQ scrambling system may change the physical layer (PHY) receiver block diagram and perform descrambling before LDPC decoding.

In one embodiment, an HARQ scrambling system may facilitate a solution that does not change the transmitter block diagram, and only the receiver block diagram when preparing for HARQ codeword (CW) storage, or for combining a receiver LDPC CW with a stored LDPC codeword.

Example embodiments of the present disclosure relate to systems, methods, and devices for transmit diversity for HARQ.

In one embodiment, a transmit diversity for HARQ system may facilitate transmitting diversity for HARQ by changing the interleaver between the initial transmission and retransmission and/or by changing the constellation mapping for initial transmission and retransmission.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment of EHT HARQ, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or maybe stationary devices.

Figure 13:
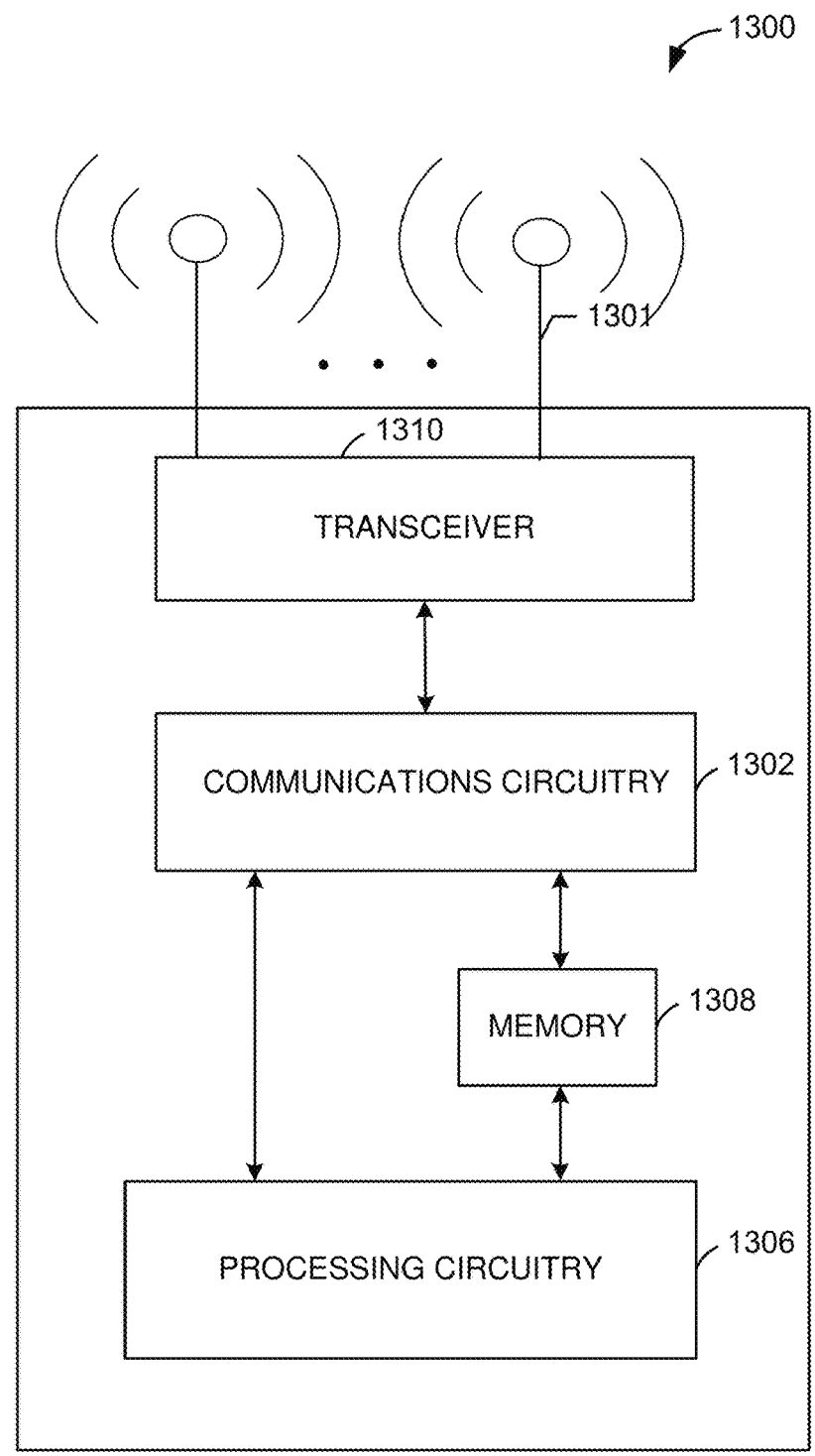
FIG. 13 illustrates a functional diagram of an exemplary communication station that may be suitable for use as a user device, in accordance with one or more example embodiments of the present disclosure.
Figure 14:
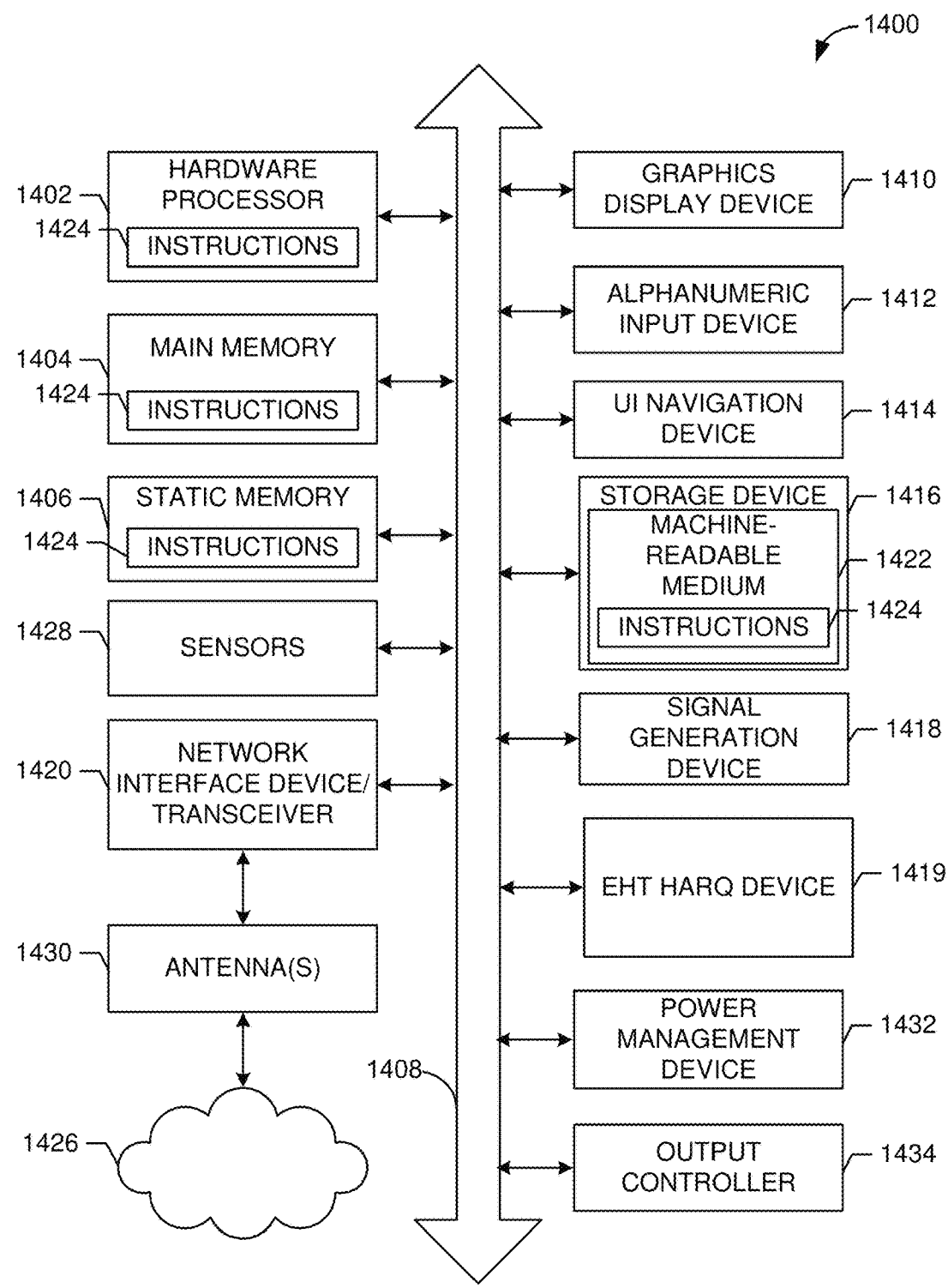
FIG. 14 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 13 and/or the example machine/system of FIG. 14.

One or more illustrative user device(s) 120 and/or AP(s) 102 may be operable by one or more user(s) 110. It should be noted that any addressable unit may be a station (STA). An STA may take on multiple distinct characteristics, each of which shapes its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device (s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.1 lax), 5 GHz channels (e.g. 802.11n, 802.11ac, 802.11ax), or 60 GHZ channels (e.g. 802.11ad, 802.11ay). 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, one or more APs 102 may implement EHT HARQ 142 with one or more user devices 120.

It is understood that the above descriptions are for purposes of illustration and are not meant to be limiting.

Figure 2:
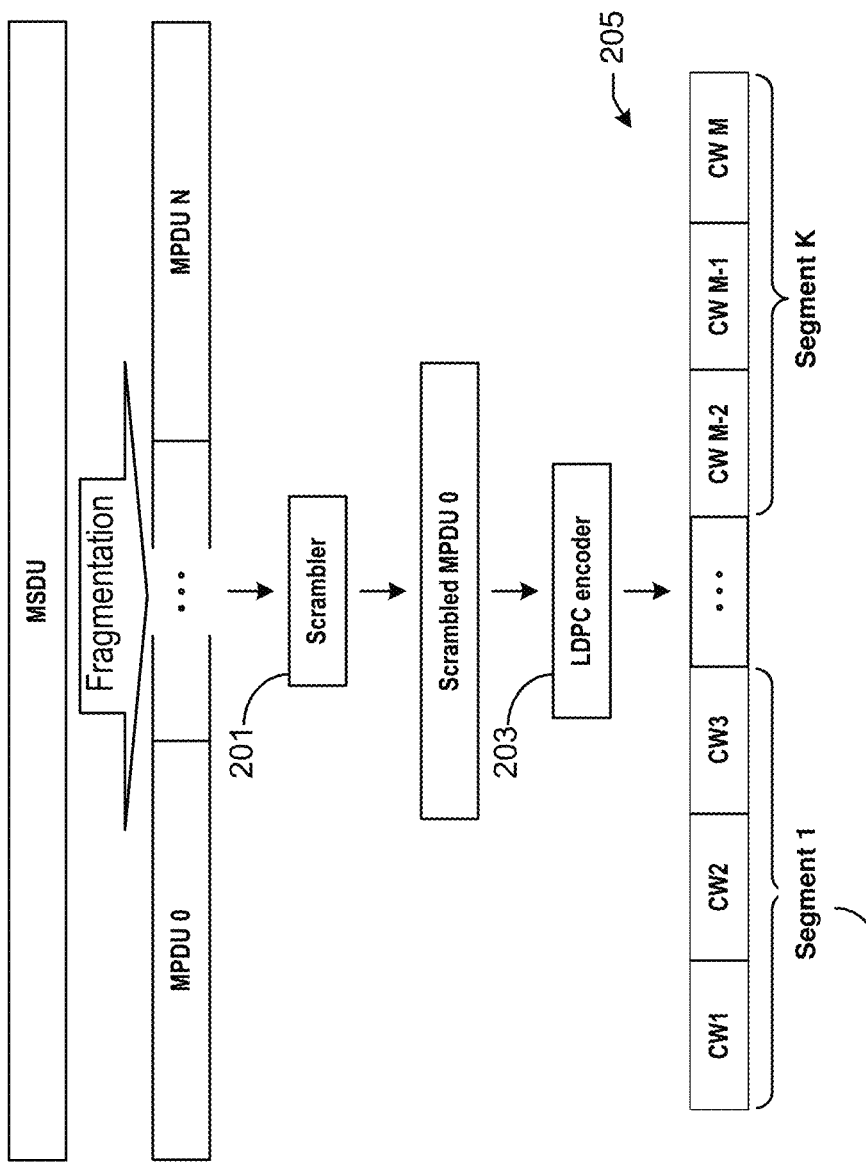
FIG. 2 depicts an illustrative schematic diagram for EHT HARQ, in accordance with one or more example embodiments of the present disclosure.

FIG. 2 depicts an illustrative schematic diagram for EHT HARQ, in accordance with one or more example embodiments of the present disclosure.

Referring to FIG. 2, there is shown an example of a HARQ scheme using segmentation. Each segment contains an equal integer number of LDPC codewords (CWs). A-MPDU is formed by a collection of segments.

In one or more embodiments, an EHT HARQ system may facilitate mechanisms to enable segmented HARQ in 802.11 EHT.

First, a description of how the MAC/PHY operates at the transmitter to enable segmented HARQ is described. Next, a description of how the receiver operates once HARQ PPDUs are received is also described.

On the HARQ transmitter side:

To enable segmented HARQ, the following steps are followed at the transmitter MAC/PHY layer:

1. A segment is defined as an integer number of low-density parity-check (LDPC) codewords.

2. Select the LDPC codeword size.

3. Segment size and codeword size are selected on a per-user and/or PPDU basis.

4. Form A-MSDU and A-MPDU. Scramble (using scrambler 201) and encode (using LDPC encoder 203) to form a HARQ PPDU (e.g., PPDU 205)

5. Divide encoded A-MPDU into segments (e.g., segment 1 202, . . . , segment K, where K is a positive integer). Note that no alignment between segments and MPDUs is considered.

On the HARQ receiver side:

1. The successfully received HARQ segments are stored in the form of decoded bits 2. Once all the segments of a certain MPDU are received, the segments are passed up and the MAC can further pass the MPDU up as long as there is no pending MPDU sequence number prior.

3. The LLRs of the unsuccessfully received HARQ segments are stored at the receiver in the order of transmission.

4. The receiver sends a selective block acknowledgment where the segment numbers are indicated to the transmitter along with the failed attempt count, which indicates how many times a segment has failed.

5. With this information, the transmitter can identify the segments that need retransmission (and the retransmission count).

In one or more embodiments, an EHT HARQ system may operate as follows:

1. Data source initiates HARQ transmission following the approach described in FIG. 2.

2. The receiver extracts segments from the received HARQ PPDU. Each LDPC codeword of a segment is decoded, and their corresponding syndrome is checked. If any of the syndromes corresponding to the LDPC codewords is greater than zero, the segment is considered in error. That is, if it is determined that an LDPC codeword does not meet certain criteria, the LDPC codeword would be considered erroneous and retransmission of that codeword would be needed.

3. Successfully decoded MPDUs preceding a first MPDU in error are passed to the logic link control (LLC) layer. Remaining successfully decoded MPDUs stay in the MAC layer.

4. Unsuccessfully decoded segment LLRs are stored in PHY buffer in sequential order. Note that only LLRs corresponding to the failed CWs should be stored. The remaining successfully decoded CWs could be stored in a different buffer (HARD bits).

5. The receiver prepares HARQ block acknowledgment (HARQ_BA) to indicate segments that require retransmission. HARQ_BA is formed by a traditional MPDU BA bit map and a segment BA bit map.

6. Upon receiving the HARQ_BA packet, the transmitter sends the next A-MPDU. The transmission window is moved according to the BA field received in HARQ_BA. However, instead of resending full MPDU packets previously decoded in error, only the segments that are in error are sent. Segments indicated in HARQ_BA are prepended to A-MPDU formed by new MPDUs.

7. Upon reception of a new HARQ packet, the receiver first combines retransmitted segments with segments stored in the LLR buffer. Successfully decoded segments are aggregated to their corresponding MPDU segments. If all segments within an MPDU packet are not in error, the MPDU packet is acknowledged.

8. HARQ CW segment retransmissions are done only during a TxOP for successive PPDU transmissions. CW segments' retransmissions are only from the immediately preceding PPDU. This way, there is no need for CW ID signaling at the beginning of the PPDU.

Figure 3:
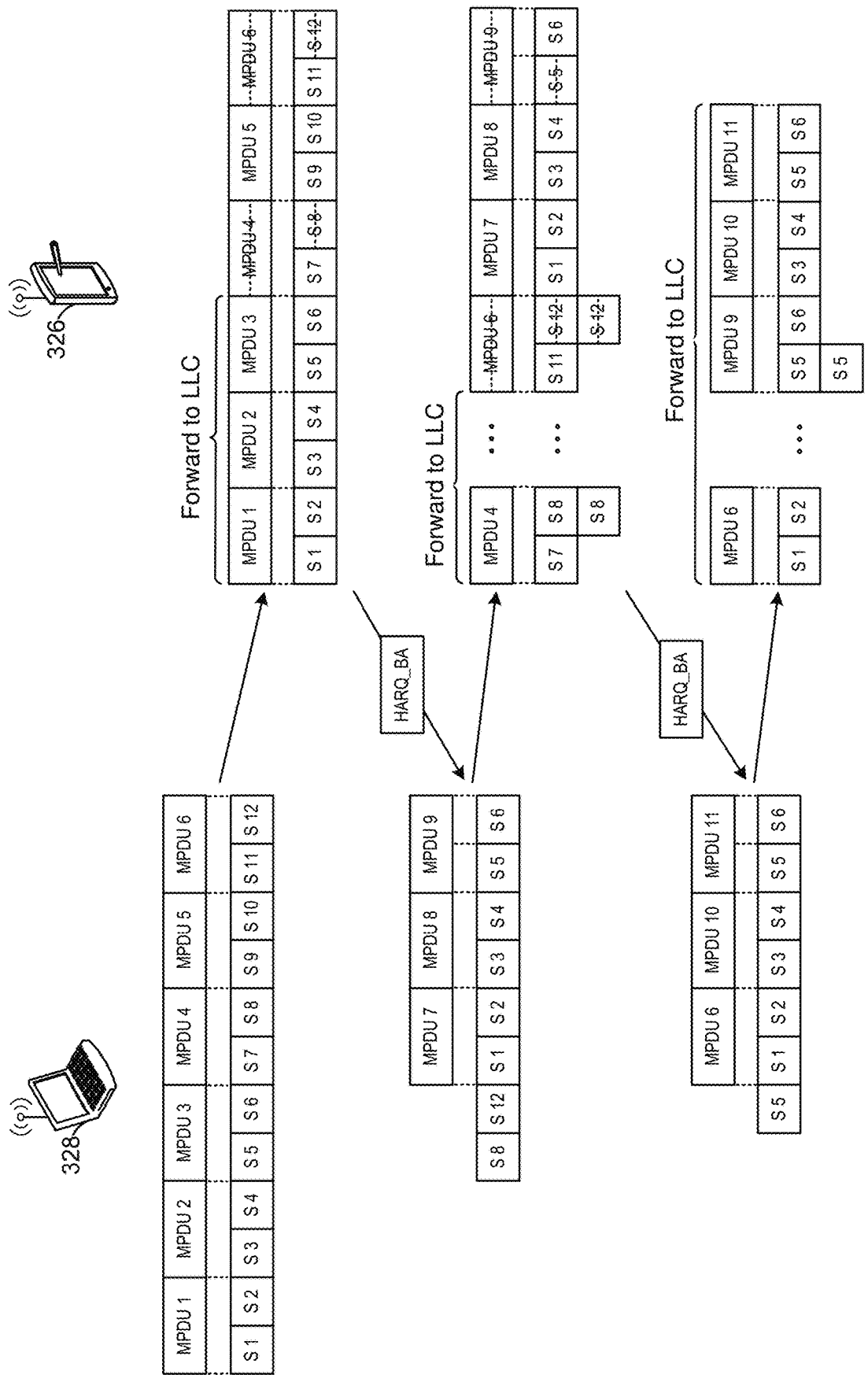
FIG. 3 depicts an illustrative schematic diagram for EHT HARQ, in accordance with one or more example embodiments of the present disclosure.

FIG. 3 depicts an illustrative schematic diagram for EHT HARQ, in accordance with one or more example embodiments of the present disclosure.

Referring to FIG. 3, there is shown an example of the HARQ protocol described above.

In this example MPDUs 1 to 6 form an A-MPDU that is being sent by transmitter 328 (e.g., a user device 120 or an AP 102 of FIG. 1). Upon receiving the HARQ PPDU (at the receiver 326 (e.g., a user device 120 or an AP 102 of FIG. 1), segments 8 (s8) and 12 (s12) are received in error. S8 and s12 corresponding log-likelihood ratios (LLRs) are stored in PHY buffer. MPDUs 1 to 3 are passed to LLC. HARQ_BA is generated requesting for the retransmission of s8 and s12, indicating also the decoding failure of MPDU 4 and 6. The transmission window is moved according to BA information contained in the HARQ_BA frame. New MPDUs 7 to 9 are prepared for transmission, with requested segments prepended to the new segments (in green). PPDU is received and s8 and s12 LLRs are combined with stored LLRs before decoding. S8 is decoded successfully, while s12 still remains in error. In addition, s5 of the second transmission is also in error and its corresponding LLR is stored in PHY buffer. S8 LLRs are dumped. A complete MPDU 6 is expected for retransmission in the next transmission. MPDUs 4 and 5 are passed to LLC. Finally, MPDUs 6, 10 and 11 form the final A-MPDU to which s5 from the second transmission is prepended. Successful decoding of all segments is achieved and MPDUs 6 to 11 are forwarded to LLC.

The total number of segments transmitted will be limited by the maximum PSDU size. As a result, the retransmitted segments are lined up first following which the new segments (corresponding to new MPDUs) are appended.

If the Total number of retransmitted segments+New segments<=the Max PSDU size.

Further, the number of segments transmitted can be limited by the receiver buffer. The HARQ_BA signal provides the receiver buffer information to the transmitter based on which the transmitter side can fill in new segments from the MAC. The receiver buffer available is provided in the form of a number of symbols ($N_{sym}^{rx}$) to the transmitter. The transmitter determines the time available to transmit new segments as follows:

$$N_{sym}^{new} = N_{sym}^{rx} - N_{sym}^{retx}$$

There is also a maximum number of retransmission, $K_{max}$, that can be user-specific. This information can be communicated as part of the capability exchange between the transmitter and receiver.

After $K_{max}$ retransmission attempts, the transmitter drops the segment and sends other pending retransmission/new segments. The receiver is aware of the segment drop and discards the segment and waits for the other segments that haven't timed out for maximum retransmission attempts.

TABLE 1

| Transmitter Signaling | |
| --- | --- |
| Retx bit | Preamble |

The transmitter may include a retransmission bit (e.g., Retx bit) to indicate that the current PSDU contains a retransmitted segment. Since the receiver is aware of the number and positions of the segments that had failed, there is no need to signal the segment IDs that are retransmitted in the new transmission. Also, the proposed method specifies a rule where the retransmissions are exactly mapping the missed segments in the immediately preceding PPDU.

In one or more embodiments, the transmitter aligns the retransmission segments in the PSDU first in the same order in which they were ACKed in the HARQ_BA. Following these, the new segments will be placed in the order in which they are handed over by the MAC.

In one or more embodiments, an EHT HARQ system may facilitate receiver signaling (enhancements to the BlockAck signaling):

The receiver indicates using a single bit 'RetxBit' whether HARQ segment retransmissions are needed for any of the received segments.

The BlockAck can include the regular ARQ BA bitmap, the HARQ segment BA bitmap, or only one of each.

Second, if the RetxBit is '1', an optional field called "SegsNeeded" is indicated that mentions the length of the Segment BA bitmap. (Note that this is implicitly known based on the parameters in the soliciting PPDU and may not be needed). The second optional field "Segment BA bitmap" field provides the BA information for the segments needing HARQ retransmission.

| Retx Bit | Block ACK Bitmap | SegsNeeded | Segment BA bitmap |
|---|---|---|---|

The HARQ_BA is a bitmap that has a bit for each of the transmitted segments. If a segment is successfully received, the receiver indicates 1, and if it has failed, the receiver indicates a 0 for the segment. The maximum length of the bitmap is the number of segments that can be transmitted in a given PPDU.

In one or more embodiments, the bitmap is used by the transmitter to determine if one or more segments have failed in the previous transmission and whether retransmission is needed for the segments.

FIGS. 4, 5A-5B, and 6 depict illustrative schematic diagrams for HARQ retransmission, in accordance with one or more example embodiments of the present disclosure.

Figure 4:
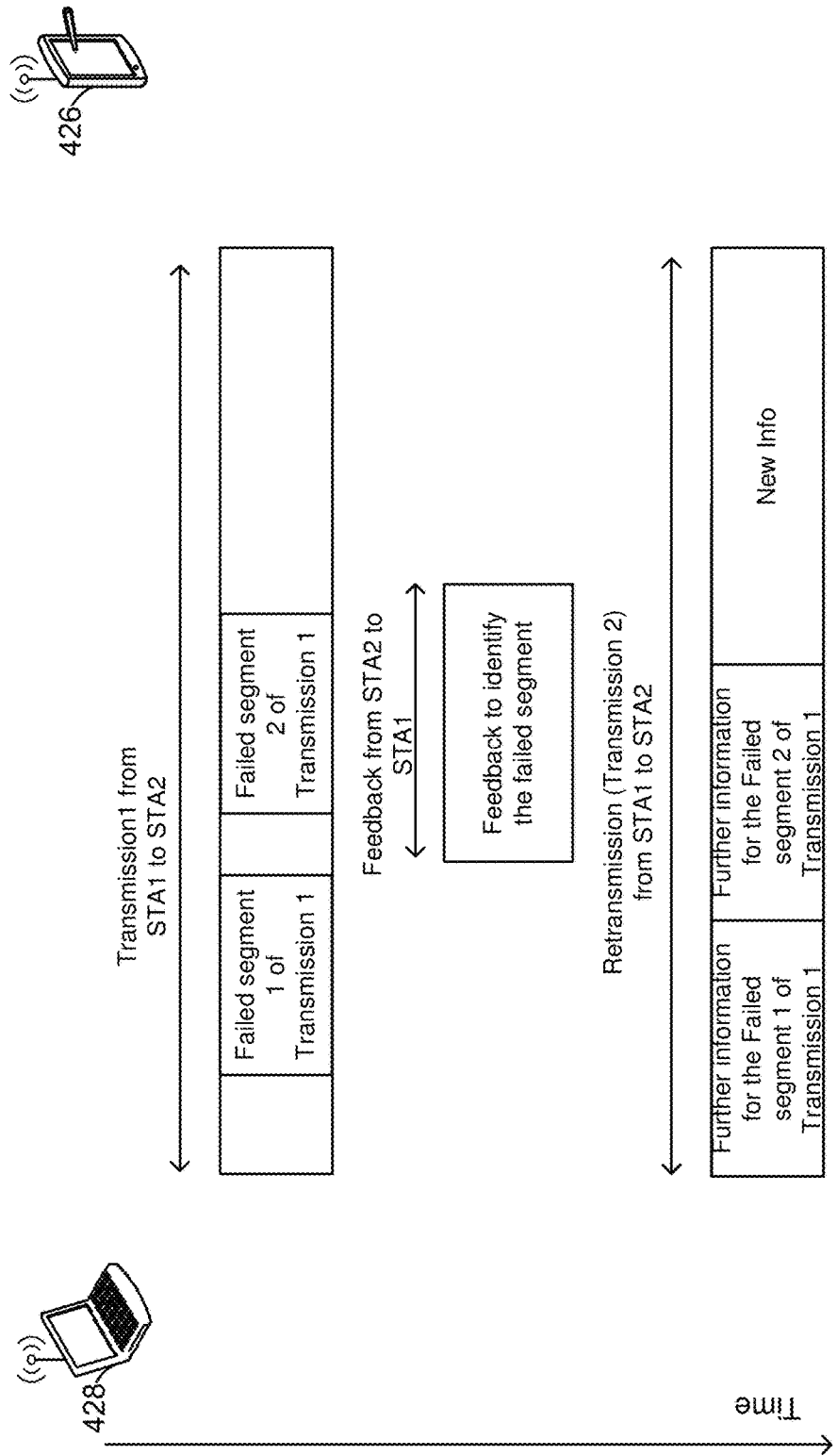

Consider the transmission from STA1 (e.g., 428, 528, or 628, which could be a user device 120 or an AP 102 of FIG. 1) to STA2 (e.g., 426, 526, or 626, which could be a user device 120 or an AP 102 of FIG. 1). The basic idea is that if part of the transmission from STA1 to STA2 cannot be decoded, then STA2 can provide some feedback to indicate the part that cannot be decoded. After STA2 provides the feedback, STA1 can then retransmit further information to STA2 to help STA2 decode the failed segment. A high-level sequence of events is shown in FIG. 4.

Now, there are different flavors for the above procedure in different steps, which are currently the main debate for the exact scheme.

For the feedback, the STA can identify the failed segment with a granularity of MPDU or granularity of LDPC codeword.

For the retransmission of further information, the exact failed segment is retransmitted (chase combining) or additional information for the failed segment is retransmitted (incremental redundancy). Note that that segment(s) is used to identify the failed portion because if STA2 cannot decode the segment, then STA2 is likely to store the whole segment in the memory for further HARQ operation.

The operation of retransmission for STA1 and STA2 is an important part of the HARQ design. An important requirement for HARQ is for STA1 to understand the failed segment that is stored in STA2 so that STA1 can retransmit the corresponding information properly.

First, if STA2 stores the failed segment, and STA1 receives the feedback from STA2, then STA1 can retransmit the information related to the failed segment of the previous transmission, and STA2 can then interpret the structure of the failed segment based on the previous transmission. However, STA2 may not know if STA1 receives the feedback or not. If STA1 receives the feedback, then STA1 will retransmit based on the feedback. If STA1 does not receive the feedback, STA1 cannot differentiate the following two cases:

(1) STA2 decodes the preamble, does not decode some or all of the PSDU transmission, and stores the failed segment of the PSDU.

(2) STA2 does not decode the preamble and does not store anything at all.

Figure 5B:
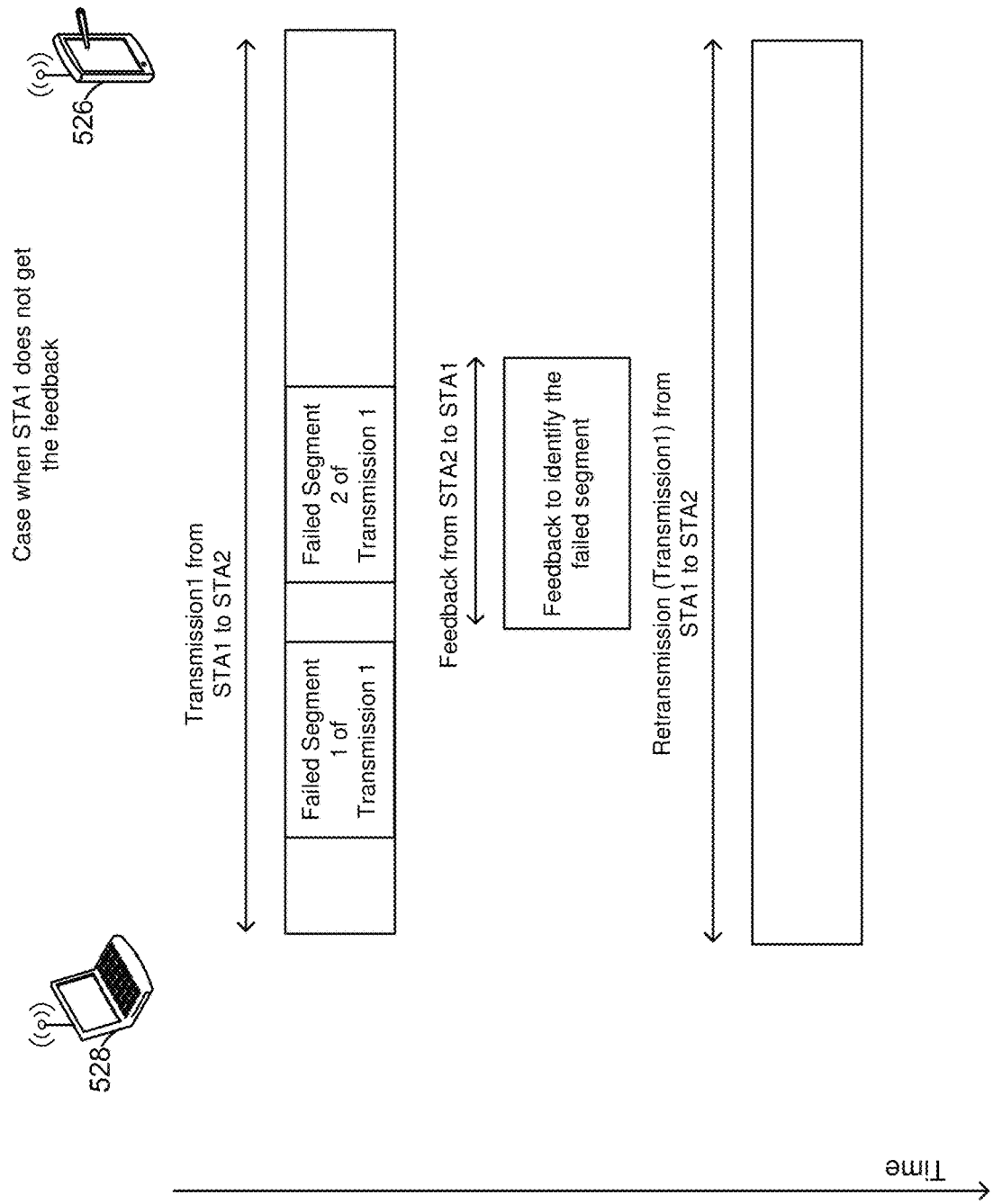

As a result, STA1 will retransmit the entire transmission again. Now, STA2 cannot assume that the retransmission will always start with the failed segment and follow by new information. An example is shown in FIGS. 5A and 5B.

Second, the existing ARQ scheme uses block ack (BA) and uses frames like block ack request (BAR) or multi-user block ack request (MU-BAR) to solicit block ack (BA) from other STAs. As a result, the BA will not return as an immediate response to the transmission. However, currently, there is no discussion on enabling this sequence to return HARQ feedback.

Figure 6:
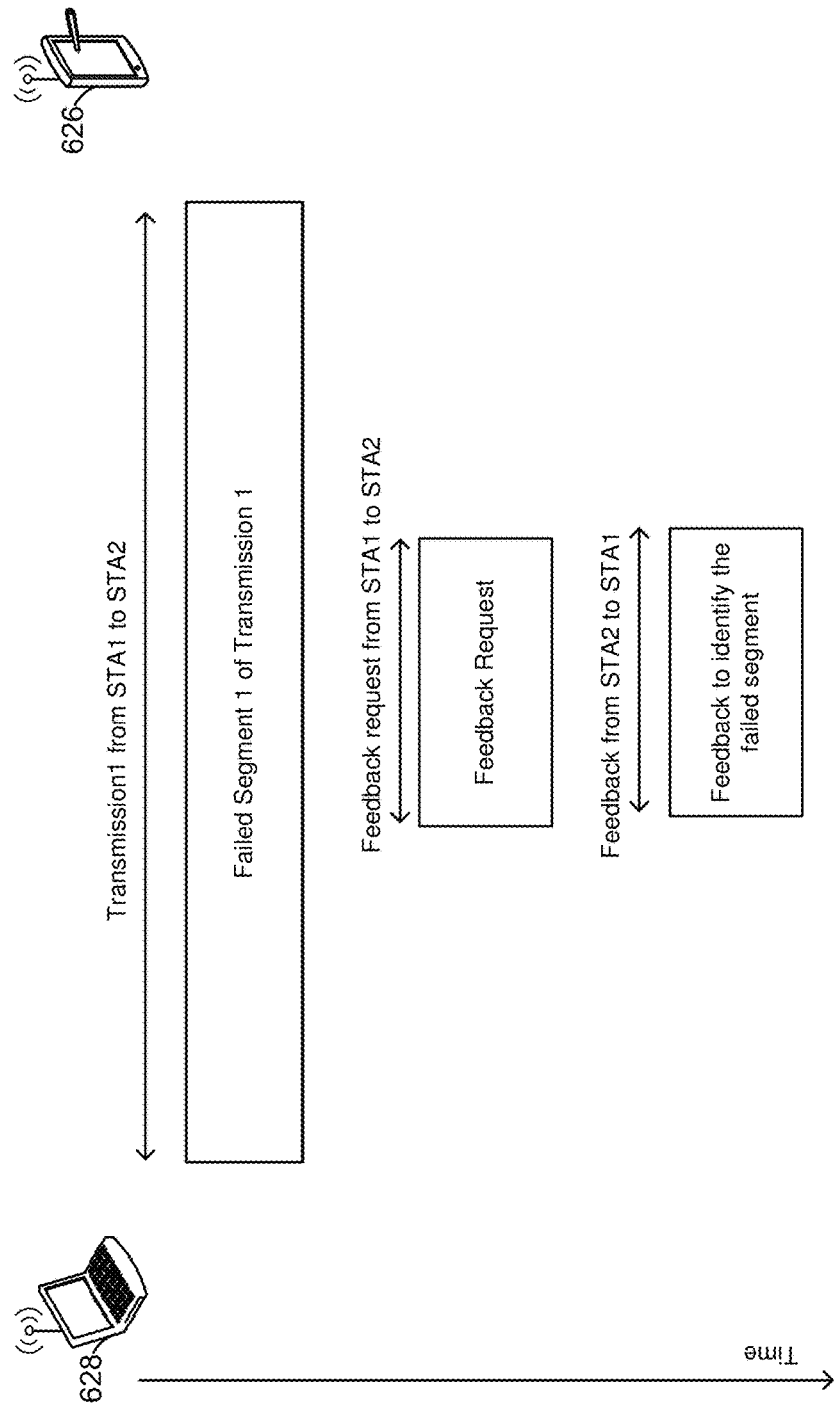

Third, it is possible that STA2 does not decode the preamble of the transmission and is still requested to send feedback as shown in the sequence of FIG. 6. In this case, STA2 does not store any failed segment, and STA1 also cannot tell whether STA2 has stored any failed segment in memory.

In one or more embodiments, for transmission from STA1 to STA2, STA1 may indicate if the transmission is for HARQ and then sending the indication to STA2. The indication can be in the preamble of the PPDU designed for EHT, which is then sent to STA2. The indication can be in the MAC header of the PPDU designed for EHT. When STA2 receives this indication, if STA2 sees the transmission is not for HARQ, STA2 can use the existing methods of returning feedback (like Ack or Block Ack). STA2 can decide not to store the failed segment of the transmission. In that case, STA1 may not provide further information for the failed segment of the transmission. The indication can further indicate if chase combining (CC) or incremental redundancy (IR) is used for HARQ.

Continuing with the design of STA1 requesting failed segment information:

An additional MAC control frame is designed for STA1 to solicit HARQ feedback from STA2. The transmission sequence number can be added in the MAC frame to allow STA2 to understand the targeting transmission for the HARQ feedback. The transmission sequence number can be added to the feedback sent by STA2. Requested Feedback type can be added to the MAC frame. The requested feedback type can be BA. The requested feedback type can be LDPC code word-level feedback. The MAC control frame can request HARQ feedback from multiple stations.

Continuing with the design of STA2 indicating a stored failed segment:

In the HARQ feedback sent from STA2 to STA1, STA2 indicates if a failed segment is stored except the information that which segment is successfully received and which segment is not successfully received. Note that it is possible that STA2 indicates the whole transmission is not received, and STA2 has not stored the whole failed transmission due to not decoding the preamble. The indication can be one bit to indicate that STA2 has not stored any failed segment in the indicated feedback. The indication can be in the preamble or MAC frame. Continuing with the design of indicating transmission sequence number for HARQ.

In one or more embodiments, STA1 has an indication to indicate the start of the HARQ operation. The indication can be in the preamble of the PPDU designed for EHT, which is then sent to STA2.

In one or more embodiments, STA1 indicates the transmission sequence number in each HARQ transmission. The indication can be in the preamble of the PPDU designed for EHT. The value can be one bit with 0 or 1. The maximum value of the transmission sequence number is the maximum number of HARQ retransmission allowed by the protocol design plus the initial value. The transmission sequence is tied to a receiver indication in the EHT preamble. Different receiver indication in the EHT preamble will have different progress of transmission sequence number. STA1 uses transmission sequence number x+1 mod maximum value in the next HARQ transmission only if STA1 receives feedback for HARQ transmission with transmission sequence number x.

For each failed segment, a segment number for the failed segment can be indicated. With the segment number and transmission sequence number, STA2 can then parse further information for each failed segment.

An example is shown below:

| Indication of Transmission Sequence number x + 1 | Indication of failed segment y for transmission sequence number x | Indication of failed segment y for transmission sequence number x | New Info |
|---|---|---|---|

The indication of the segment number can be in the preamble of the PPDU designed for EHT.

An alternative for identifying the failed segment is that STA2 assumes that STA1 always puts further information of a failed segment of transmission x in front of transmission x+1. In that case, STAs can use the size of the stored failed segment to do the matching of the failed segment of transmission x. It is understood that the above descriptions are for purposes of illustration and are not meant to be limiting.

Figure 7:
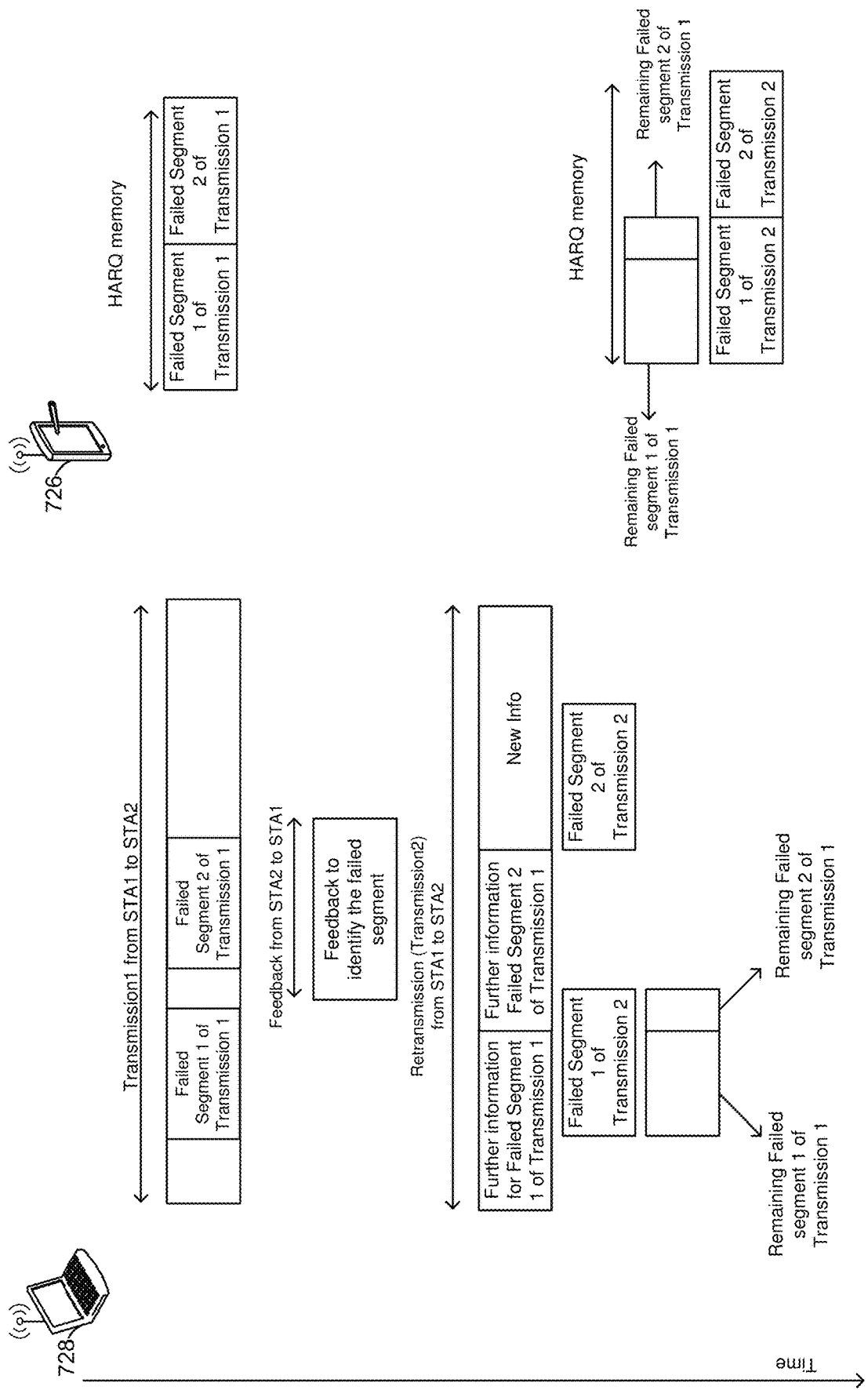
FIG. 7 depicts an illustrative schematic diagram for HARQ retransmission, in accordance with one or more example embodiments of the present disclosure.

FIG. 7 depicts an illustrative schematic diagram for HARQ retransmission, in accordance with one or more example embodiments of the present disclosure.

Referring to FIG. 7, there is shown an example of LDPC codeword granularity and CC.

Continuing with the design of HARQ memory design, an indication from STA1 (e.g., user device 728, which could be a user device 120 or an AP 102 of FIG. 1) to indicate to STA2 (e.g., user device 726, which could be a user device 120 or an AP 102 of FIG. 1) to flush memory. This indication may also signal that the last transmission of the HARQ transmission is sent. When STA2 receives that indication, it flushes its memory and erases the content of the memory where the failed segment was stored.

In one or more embodiments, STA2 reacts to the indication by flushing all stored failed segments of transmission. The indication can be in the preamble of the PPDU designed for EHT. To help STA1 understand the remaining memory of STA1 for HARQ, STA2 can indicate the remaining memory of HARQ in the feedback. The indication causes STA1 to limit the new info added to the new transmission because new info (if failed decoding) needs to be stored by the STA2. The indication of flushing memory can be implicitly based on a certain agreed rule.

Figure 8A:
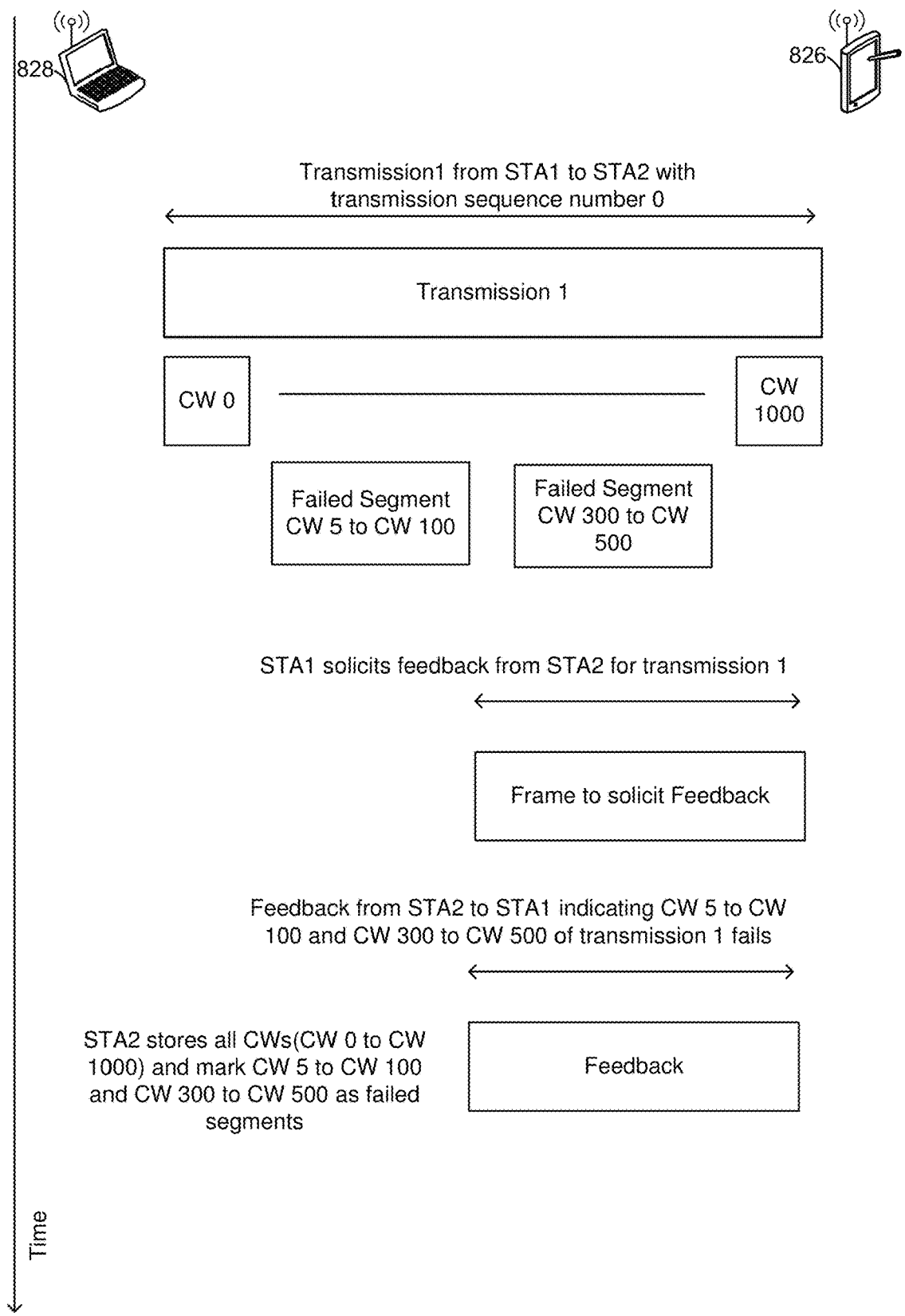
FIGS. 8A-8C depict illustrative schematic diagrams for HARQ retransmission, in accordance with one or more example embodiments of the present disclosure.

FIGS. 8A-AC depict illustrative schematic diagrams for HARQ retransmission, in accordance with one or more example embodiments of the present disclosure.

Figure 8B:
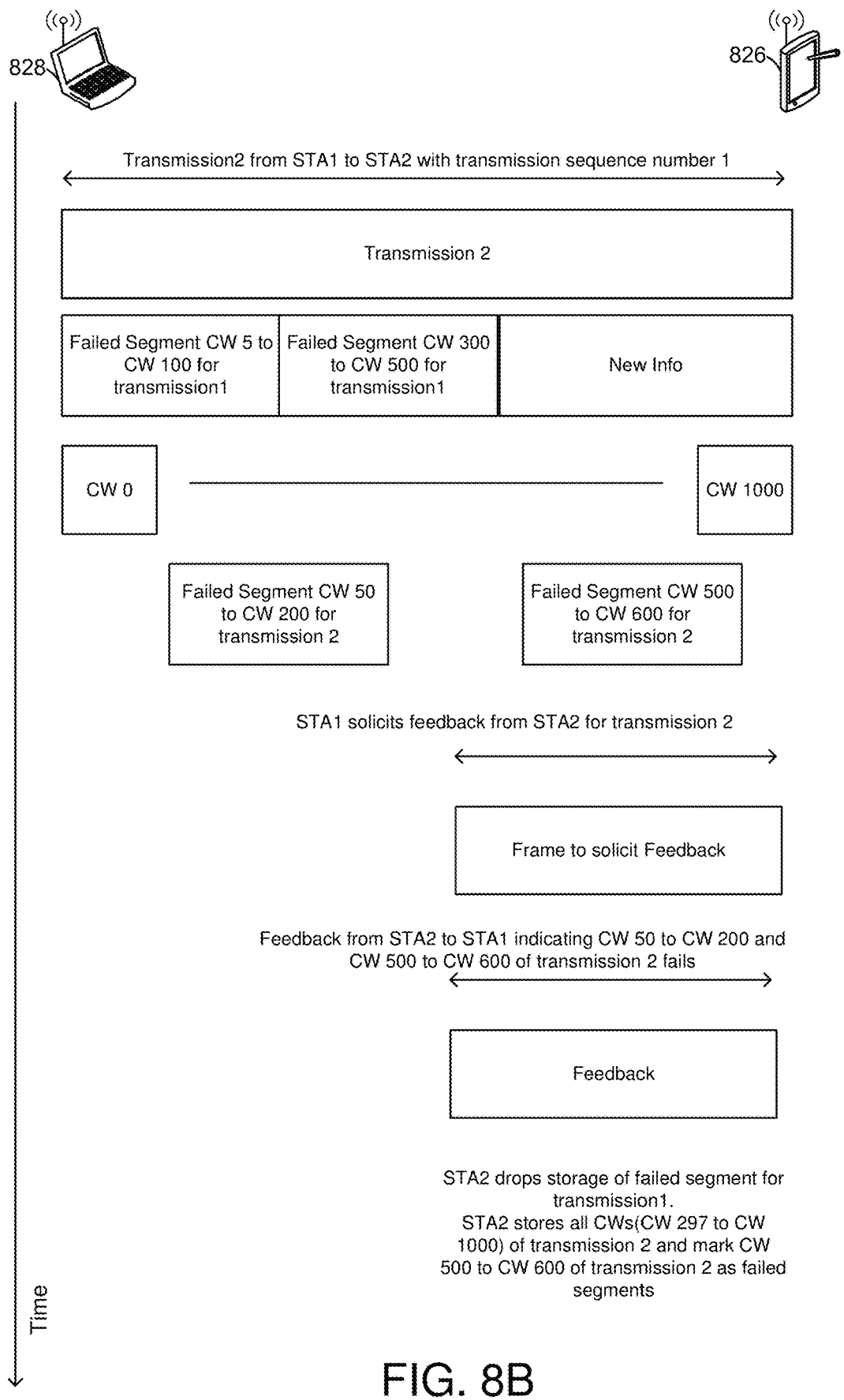
Figure 8C:
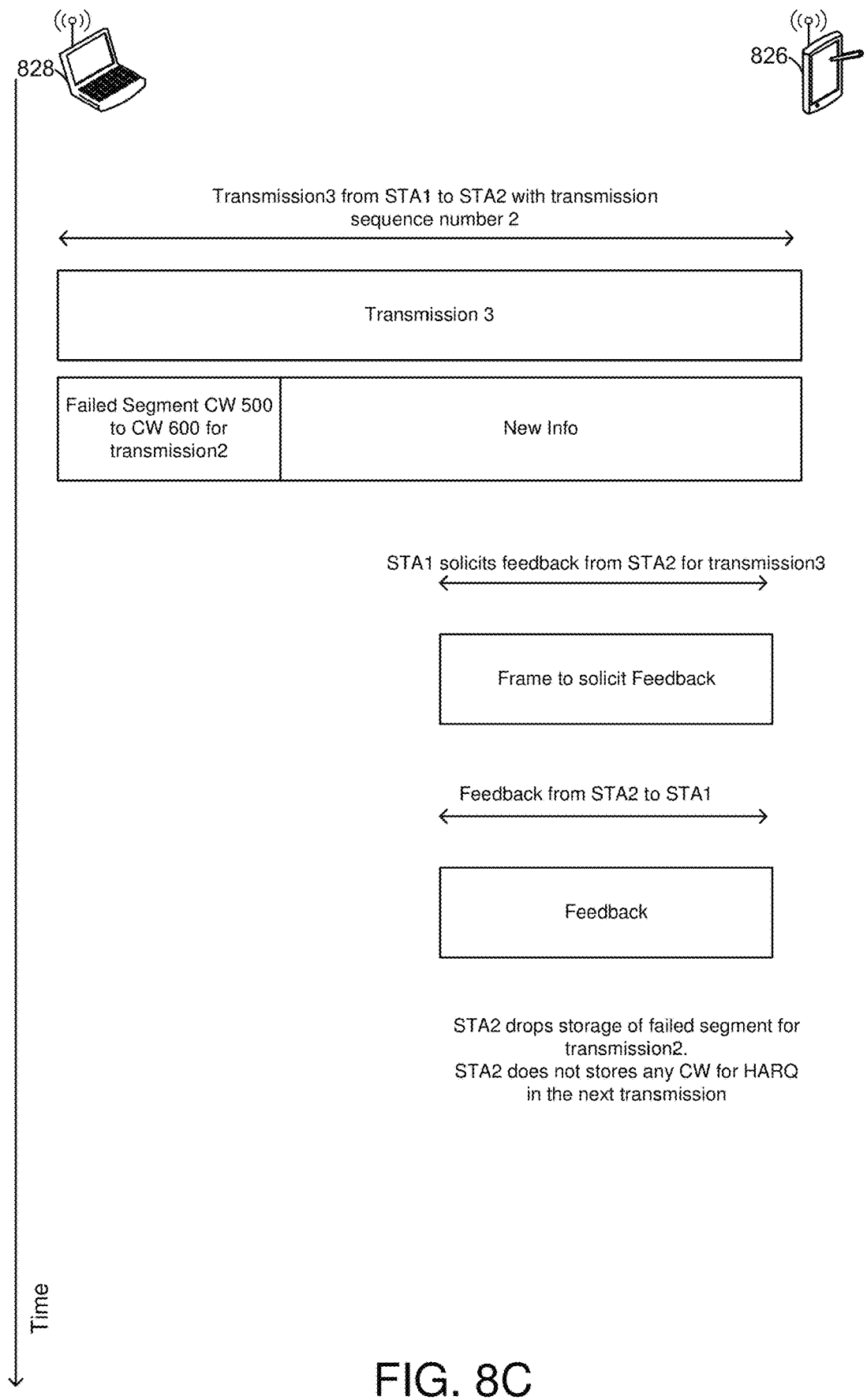

Referring to FIGS. 8A, 8B, and 8C, there is shown a flow of transmissions 1 through transmission 3 using HARQ from STA1 (e.g., user device 828, which could be a user device 120 or an AP 102 of FIG. 1) to STA2 (e.g., user device 826, which could be a user device 120 or an AP 102 of FIG. 1).

In one or more embodiments, STA2 stores a failed segment of a transmission (based on transmission sequence number x) for the next transmission (transmission sequence number x+1).

Continuing with the design for STA2 to simplify the HARQ operation, STA2 can stop storing a failed segment if it cannot recover the failed segment using the additional information in the next transmission. STA2 can stop storing the correct segment, which requires a failed segment to recover the MPDU.

One or more examples are provided to show how the proposed methods can enable a simplified design. Assume that STA2 provides feedback with codeword level. Assume that chase combining is used. Assume that STA2 stores failed segments of transmission just for additional transmission. The sequence of events may be as follows:

STA1 sends transmission 1 with transmission sequence number 0 and an indication of a new start of HARQ. Transmission 1 has CW labeled from 0 to 1000. STA1 indicates HARQ is used.

STA2 fails to decode CW 5 to CW 100 and CW 300 to CW 500 of transmission 1.

STA2 stores all CWs of transmission 1 and marks CW 5 to CW 100 and CW 300 to CW 500 of transmission 1 as a failed segment.

STA1 solicits feedback from STA2 using the specific design frame for transmission 1.

STA2 reports the information of transmission 1 in HARQ feedback. STA2 indicates a failed segment of transmission 1 is stored.

STA1 retransmits with a failed segment of CW 5 to CW 100 and CW 300 to CW 500 of transmission 1. They are mapped as CW 0 to 95 and CW 96 to 296 in transmission 2. STA1 adds new information. STA1 indicates HARQ is used.

STA2 fails to decode CW 50 to CW 200 and CW 500 to CW 600 in transmission 2.

STA2 fails to construct any MPDU out of the transmission 1 based on CC. STA2 drops all stored CWs of transmission 1. STA2 stores CW 297 to CW1000 and marks CW 500 to CW 600 in transmission 2 as a failed segment.

STA1 solicits feedback from STA2 using the specific design frame for transmission 2.

STA2 reports the information in HARQ feedback. STA2 indicates a failed segment of transmission 2 is stored.

STA1 retransmits with the failed segment of CW 500 to CW 600 of transmission 2. The transmission is transmission 3 with transmission sequence number 2. STA1 adds new information. STA1 indicates HARQ is not going to be used after this transmission.

STA2 finishes combining for new info in transmission 2. STA2 drops the storage of any CWs for HARQ CC in transmission 1 or transmission 2 based on the indication by STA1 in transmission 3. STA2 does not store any CW in transmission 3 based on the indication in transmission 3.

STA1 solicits feedback from STA2 using the specific design frame for transmission 3.

STA2 reports the information in HARQ feedback. STA2 indicates a failed segment of transmission 3 is not stored. It is understood that the above descriptions are for purposes of illustration and are not meant to be limiting.

Figure 9:
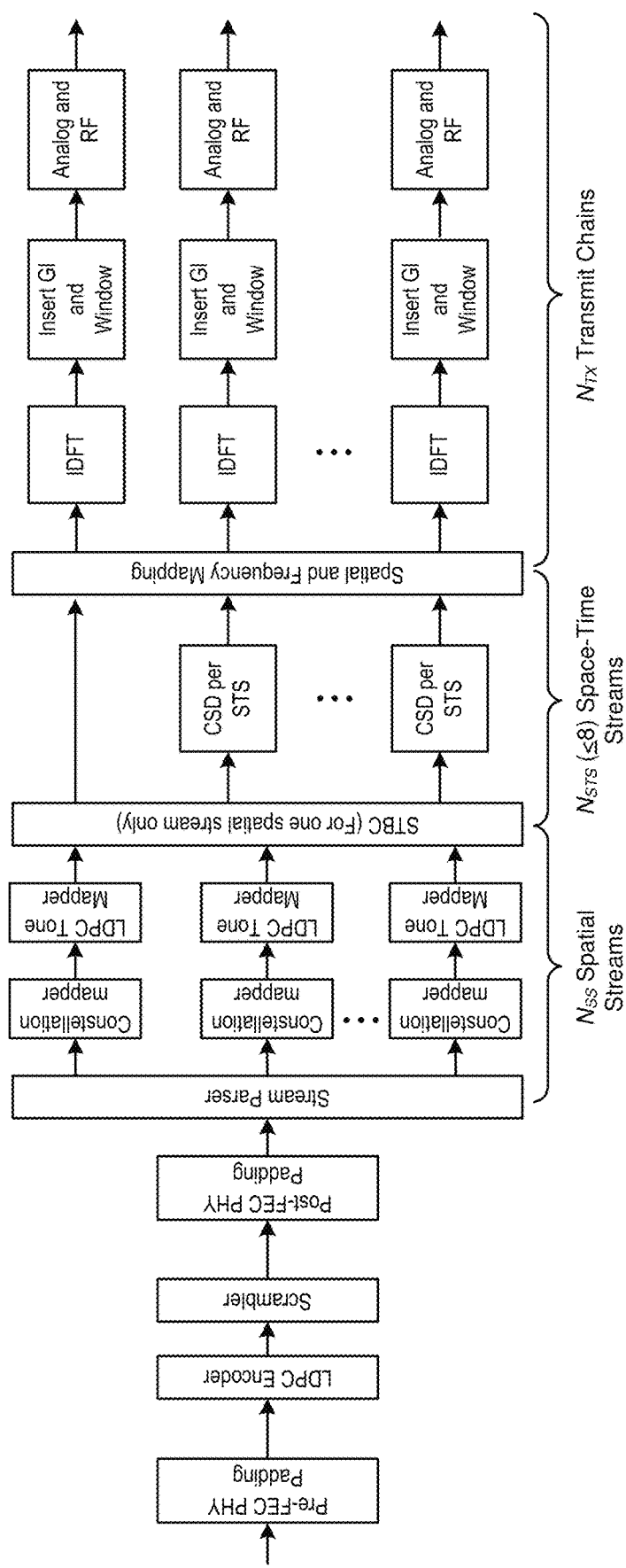
FIG. 9 depicts an illustrative schematic diagram for HARQ scrambling, in accordance with one or more example embodiments of the present disclosure.

FIG. 9 depicts an illustrative schematic diagram for HARQ scrambling, in accordance with one or more example embodiments of the present disclosure.

HARQ can have a strong impact on the architecture and the intention is to try and have a design that is as simple as possible. Scrambling is currently performed before the channel coding at the transmitter side, and descrambling is performed after the LDPC decoder at the receiver side. This causes a lot of complexity for the combining of different segments that have been received with different scrambling sequences. The transmitter block diagram is shown in the above FIG. 9 for a simple single-user transmission.

Figure 10:
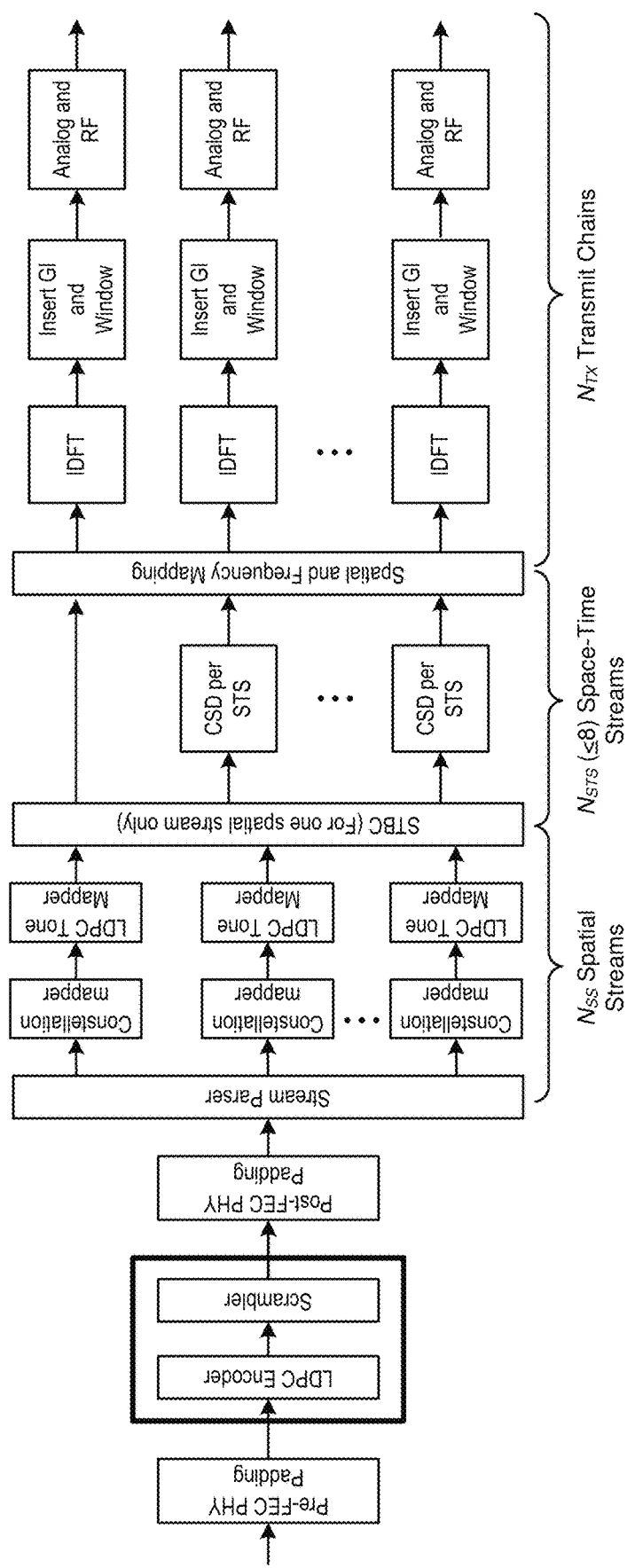
FIG. 10 depicts an illustrative schematic diagram for HARQ scrambling, in accordance with one or more example embodiments of the present disclosure.

FIG. 10 depicts an illustrative schematic diagram for HARQ scrambling, in accordance with one or more example embodiments of the present disclosure.

In one or more embodiments, a HARQ scrambling system may facilitate performing scrambling after the low-density parity-check (LDPC) encoder in the transmitter block diagram when HARQ is intended, as shown in FIG. 10. The scrambler, therefore, applies to the coded bits, and not to the un-coded bits as done today. That means that on the receiver side, the descrambler needs to be performed before the LDPC decoder. This has the advantage that the receiver can store the log-likelihood ratio (LLR) of low-density parity-check (LDPC) codewords as is, and will be able to combine them without other scrambling-related processing. This also allows the transmitter to store previously transmitted codewords for future retransmissions, or to store uncoded codewords for future retransmissions, without further scrambling-related processing. This also allows the transmitter to apply a single scrambling on each PPDU, and not apply different scrambling on a different part of the PPDU transmission.

In one or more embodiments, it should be noted that it is also possible to keep current architecture at the transmitter side (meaning scrambler before the LDPC encoding), and just have an implementation at the receiver side to perform scrambling before the LDPC decoding. In this case, the descrambling sequence has to be based on the scrambling sequence applied at the transmitter which is encoded with the same LDPC coding in order to be corresponding to the scrambling sequence applied on the coded bits. This allows similarly the receiver to store the LLR and combine them independently of the scrambling sequences. This also allows the transmitter to apply scrambling on the entire PPDU. This, however, creates some slight architecture restrictions on the transmitter side for storage perspectives to be ready in case of CW retransmissions.

In one or more embodiments, the transmitter cannot store directly LDPC CWs (coded sequences) as they include the scrambling sequence. They need to store the uncoded bit sequence that corresponds to an LDPC codeword (the sequence of bits that lead to the LDPC codeword after LDPC encoding process) before scrambling. If a retransmission is generated for a stored LDPC codeword, the transmitter would retrieve this uncoded bit sequence, and process it with the unchanged block diagram.

In one or more embodiments, a transmit diversity for HARQ system may facilitate the following approaches to exploit the diversity gain:

Option 1) Change the interleaver or tone mapper in the retransmission to achieve diversity gain.

The binary convolutional coding (BCC) code and low-density parity-check (LDPC) code have different approaches for interleaving. For BCC, each spatial stream will be interleaved according to the block interleaver. For LDPC the block interleaver is applied in the constellation level.

For BCC, a transmit diversity for HARQ system may facilitate changing the interleaver in each retransmission for diversity gain. For instance, the encoded bits can be shuffled with a different pattern and put into the same interleaver as defined in 11ax. This is equivalent to a different interleaver. To be specific, the input bits of the interleaver can be indexed in the initial transmission as $b\_i$, $i=1, 2, \ldots, N\_CBPSS$, where $N\_CBPSS$ is the number of encoded bits per spatial stream. In the retransmission, the input bits of the interleaver can be indexed as $b\_i$, $i=1, 3, 5, \ldots, N\_CBPSS-1, 2, 4, 6, \ldots N\_CBPSS$.

For another instance, different block interleaver patterns can be defined for each retransmission. The table below lists the parameters used for BCC interleaver. N_Col, N_Row combination for 26 RU size can be changed to 6, 4×N_BPSCS; N_Col, N_Row combination for 26 RU size can be changed to 8, 6×N_BPSCS; and so on.

| DCM | Parameter | RU size (tones) | | | | HE-SIG-A/HE-SIG-B (tones) |
| --- | --- | --- | --- | --- | --- | --- |
| | | 26 | 52 | 106 | 242 | 56 |
| Not used | $N_{COL}$ | 8 | 16 | 17 | 26 | 13 |
| | $N_{ROW}$ | $3 \times N_{BPSCS}$ | $3 \times N_{BPSCS}$ | $6 \times N_{BPSCS}$ | $9 \times N_{BPSCS}$ | $4 \times N_{BPSCS}$ |
| | $N_{ROT}$ | 2 | 11 | 29 | 58 | — |

For LDPC, the tone mapper is applied after constellation mapping in each spatial stream.

Similar to BCC, the transmit diversity for HARQ system may facilitate changing the tone mapping pattern in the retransmissions for diversity gain. For instance, the input constellations of the LDPC tone mapper can be indexed in the initial transmission as $c\_i$, $i=1, 2, \ldots, N\_SD$, where $N\_SD$ is the number of data tones in an RU. In the retransmission, the input constellations of the LDPC tone mapper can be re-indexed as $c\_i$, $i=1, 3, 5, \ldots, N\_SD-1, 2, 4, 6, \ldots N\_SD$.

For another instance, a transmit diversity for HARQ system may facilitate changing the D_TM which is used in the LDPC tone mapper as shown in the table below. E.g. D_TM for 52 tone RU can be changed to 6, 8, 4 in different retransmissions. D_TM of 242 tone RU can be changed to 3, 6, 13 in different retransmissions.

| Parameter | RU Size (tones) | | | | | | |
| --- | --- | --- | --- | --- | --- | --- | --- |
| | 26 | 52 | 106 | 242 | 484 | 996 | 2 × 996 |
| $D_{TM}$ | 1 | 3 | 6 | 9 | 12 | 20 | 20 |

Option 2) Change the constellation mapping for initial transmission and retransmission. Without loss of generality, a 16QAM constellation mapping (as in FIG. 9) is used as an example, $i_1 i_2 q_1 q_2$ are the 4 bits for 16-QAM. As shown in FIG. 9, $i_1$ and $q_1$ are the most reliable bits and $i_2$ and $q_2$ are the least reliable bits.

In the initial transmission, if a bit is mapped to $i_1$ or $q_1$, it could be mapped to $i_2$ or $q_2$ in the retransmission. This can be achieved by shuffling the input bits of the constellation mapper. For instance, the input bits of the constellation mapper can be indexed in the initial transmission as $b\_i$, $i=1, 2, \ldots, N\_CBPSS$, where $N\_CBPSS$ is the number of encoded bits per spatial stream. In the retransmission, the input bits of the constellation mapper can be reindexed as $b\_i$, $i=2, 4, 1, 3, 6, 8, 5, 7 \ldots, N\_CBPSS$. The same principle can be applied to 64QAM, 256QAM, 1024QAM.

Figure 11:
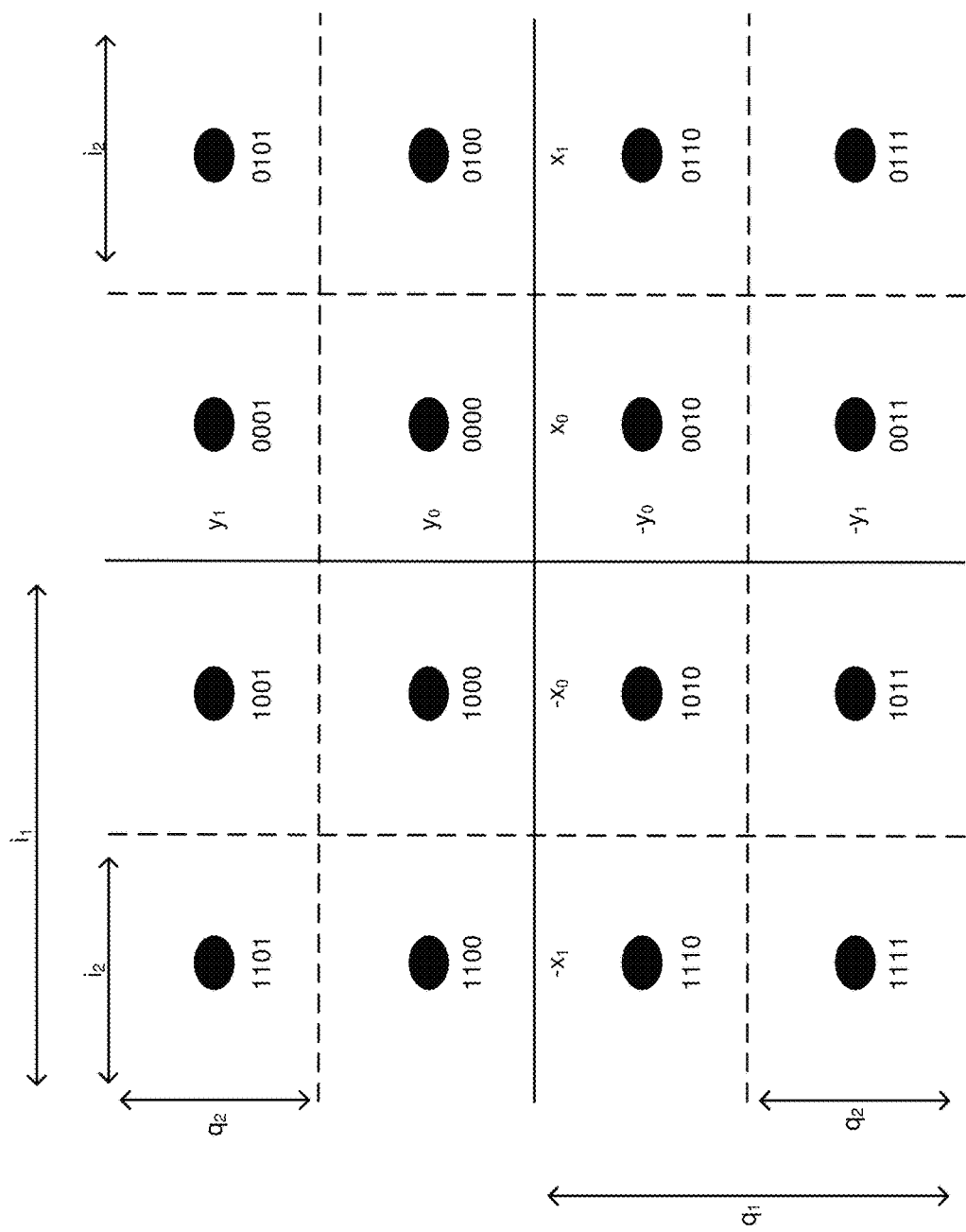
FIG. 11 depicts an illustrative schematic diagram for transmit diversity for HARQ, in accordance with one or more example embodiments of the present disclosure.

FIG. 11 depicts an illustrative schematic diagram for transmit diversity for HARQ, in accordance with one or more example embodiments of the present disclosure.

Referring to FIG. 11, there is shown a 16QAM constellation mapping.

It is understood that the above descriptions are for purposes of illustration and are not meant to be limiting.

Figure 12:
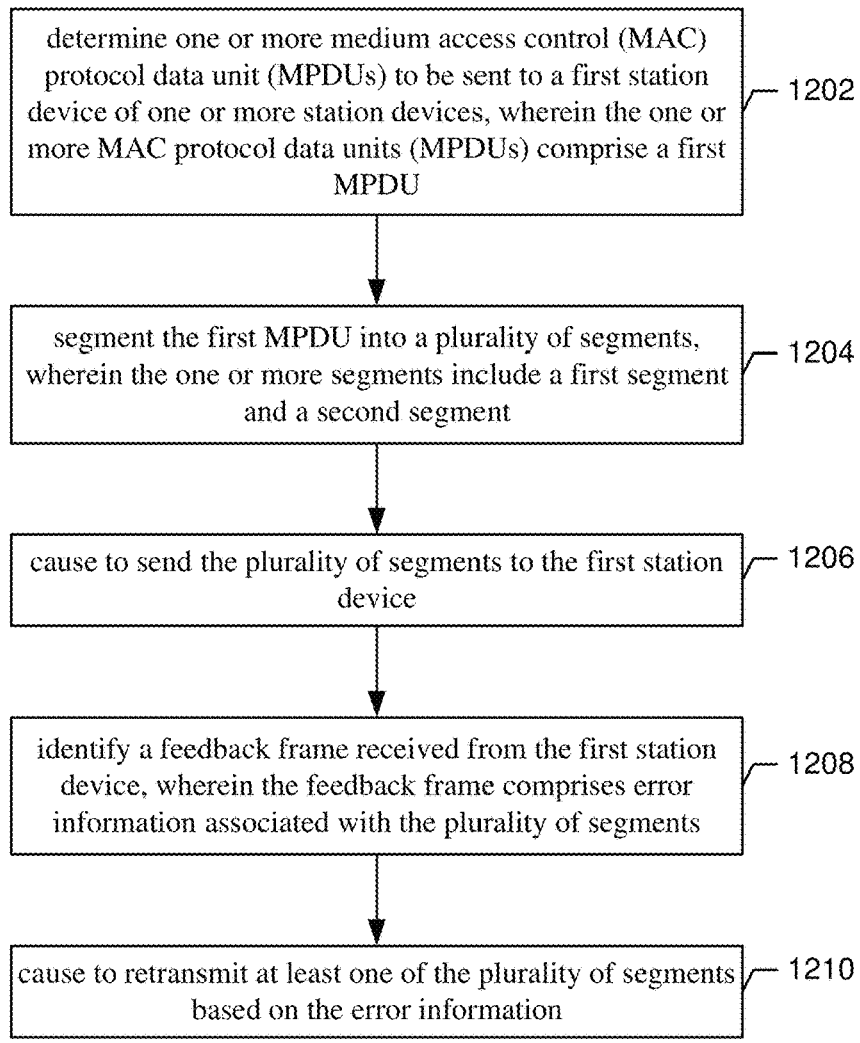
FIG. 12 illustrates a flow diagram of an illustrative process for an EHT HARQ system, in accordance with one or more example embodiments of the present disclosure.

FIG. 12 illustrates a flow diagram of illustrative process 1200 for a EHT HARQ system, in accordance with one or more example embodiments of the present disclosure.

At block 1202, a device (e.g., the user device(s) 120 and/or the AP 102 of FIG. 1) may determine one or more medium access control (MAC) protocol data unit (MPDUs) to be sent to a first station device of one or more station devices, wherein the one or more MAC protocol data units (MPDUs) comprise a first MPDU. The device may cause to send an indication associated with the hybrid automatic repeat request (HARQ). This indication indicates that the first station device that a transmission of the plurality of segments is for HARQ. The indication also may indicate to the first station device whether to store a failed segment of the plurality of segments.

At block 1204, the device may segment the first MPDU into a plurality of segments, wherein the one or more segments include a first segment and a second segment.

At block 1206, the device may cause to send the plurality of segments to the first station device.

At block 1208, the device may identify a feedback frame received from the first station device, wherein the feedback frame comprises error information associated with the plurality of segments. When the device receives the feedback frame, this may indicate to that device that at least one of the plurality of segments has failed at the first station. The feedback frame may be a hybrid automatic repeat request (HARQ) block acknowledgment frame. The error information may comprise a retransmit bid that is set to 0 or 1 based on whether retransmission is needed. The device may determine the retransmission bit is set to 1 indicating retransmission of the at least one of the plurality of segments is needed. The device may also identify a hybrid automatic repeat request (HARQ) segment bitmap included in the feedback frame. The device may determine that the first segment needs retransmission based on a corresponding bit in the bitmap is set to 1. The device may determine that the second segment does not retransmission based on a corresponding bit in the bitmap being set to 0.

At block 1210, the device may cause to retransmit at least one of the plurality of segments based on the error information.

It is understood that the above descriptions are for purposes of illustration and are not meant to be limiting.

FIG. 13 shows a functional diagram of an exemplary communication station 1300, in accordance with one or more example embodiments of the present disclosure. In one embodiment, FIG. 13 illustrates a functional block diagram of a communication station that may be suitable for use as an AP 102 (FIG. 1), or a user device 120 (FIG. 1), in accordance with some embodiments. The communication station 1300 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 1300 may include communications circuitry 1302 and a transceiver 1310 for transmitting and receiving signals to and from other communication stations using one or more antennas 1301. The communications circuitry 1302 may include circuitry that can operate the physical layer (PHY) communications and/or medium access control (MAC) communications for controlling access to the wireless medium, and/or any other communications layers for transmitting and receiving signals. The communication station 1300 may also include processing circuitry 1306 and memory 1308 arranged to perform the operations described herein. In some embodiments, the communications circuitry 1302 and the processing circuitry 1306 may be configured to perform operations detailed in the above figures, diagrams, and flows.

In accordance with some embodiments, the communications circuitry 1302 may be arranged to contend for a wireless medium and configure frames or packets for communicating over the wireless medium. The communications circuitry 1302 may be arranged to transmit and receive signals. The communications circuitry 1302 may also include circuitry for modulation/demodulation, upconversion/downconversion, filtering, amplification, etc. In some embodiments, the processing circuitry 1306 of the communication station 1300 may include one or more processors. In other embodiments, two or more antennas 1301 may be coupled to the communications circuitry 1302 arranged for sending and receiving signals. The memory 1308 may store information for configuring the processing circuitry 1306 to perform operations for configuring and transmitting message frames and performing the various operations described herein. The memory 1308 may include any type of memory, including non-transitory memory, for storing information in a form readable by a machine (e.g., a computer). For example, the memory 1308 may include a computer-readable storage device, read-only memory (ROM), random-access memory (RAM), magnetic disk storage media, optical storage media, flash-memory devices and other storage devices and media.

In some embodiments, the communication station 1300 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 1300 may include one or more antennas 1301. The antennas 1301 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 1300 may include one or more of a keyboard, a display, a non-volatile memory port, multiple antennas, a graphics processor, an application processor, speakers, and other mobile device elements. The display may be an LCD screen including a touch screen.

Although the communication station 1300 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 1300 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 1300 may include one or more processors and may be configured with instructions stored on a computer-readable storage device.

FIG. 14 illustrates a block diagram of an example of a machine 1400 or system upon which any one or more of the techniques (e.g., methodologies) discussed herein may be performed. In other embodiments, the machine 1400 may operate as a standalone device or may be connected (e.g., networked) to other machines. In a networked deployment, the machine 1400 may operate in the capacity of a server machine, a client machine, or both in server-client network environments. In an example, the machine 1400 may act as a peer machine in peer-to-peer (P2P) (or other distributed) network environments. The machine 1400 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1400 may include a hardware processor 1402 (e.g., a central processing unit (CPU), a graphics processing unit (GPU), a hardware processor core, or any combination thereof), a main memory 1404 and a static memory 1406, some or all of which may communicate with each other via an interlink (e.g., bus) 1408. The machine 1400 may further include a power management device 1432, a graphics display device 1410, an alphanumeric input device 1412 (e.g., a keyboard), and a user interface (UI) navigation device 1414 (e.g., a mouse). In an example, the graphics display device 1410, alphanumeric input device 1412, and UI navigation device 1414 may be a touch screen display. The machine 1400 may additionally include a storage device (i.e., drive unit) 1416, a signal generation device 1418 (e.g., a speaker), a EHT HARQ device 1419, a network interface device/transceiver 1420 coupled to antenna(s) 1430, and one or more sensors 1428, such as a global positioning system (GPS) sensor, a compass, an accelerometer, or other sensor. The machine 1400 may include an output controller 1434, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 1416 may include a machine readable medium 1422 on which is stored one or more sets of data structures or instructions 1424 (e.g., software) embodying or utilized by any one or more of the techniques or functions described herein. The instructions 1424 may also reside, completely or at least partially, within the main memory 1404, within the static memory 1406, or within the hardware processor 1402 during execution thereof by the machine 1400. In an example, one or any combination of the hardware processor 1402, the main memory 1404, the static memory 1406, or the storage device 1416 may constitute machine-readable media.

The EHT HARQ device 1419 may carry out or perform any of the operations and processes (e.g., process 1200) described and shown above.

It is understood that the above are only a subset of what the EHT HARQ device 1419 may be configured to perform and that other functions included throughout this disclosure may also be performed by the EHT HARQ device 1419.

While the machine-readable medium 1422 is illustrated as a single medium, the term "machine-readable medium" may include a single medium or multiple media (e.g., a centralized or distributed database, and/or associated caches and servers) configured to store the one or more instructions 1424.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1400 and that cause the machine 1400 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1424 may further be transmitted or received over a communications network 1426 using a transmission medium via the network interface device/transceiver 1420 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1420 may include one or more physical jacks (e.g., Ethernet, coaxial, or phone jacks) or one or more antennas to connect to the communications network 1426. In an example, the network interface device/transceiver 1420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1400 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 15:
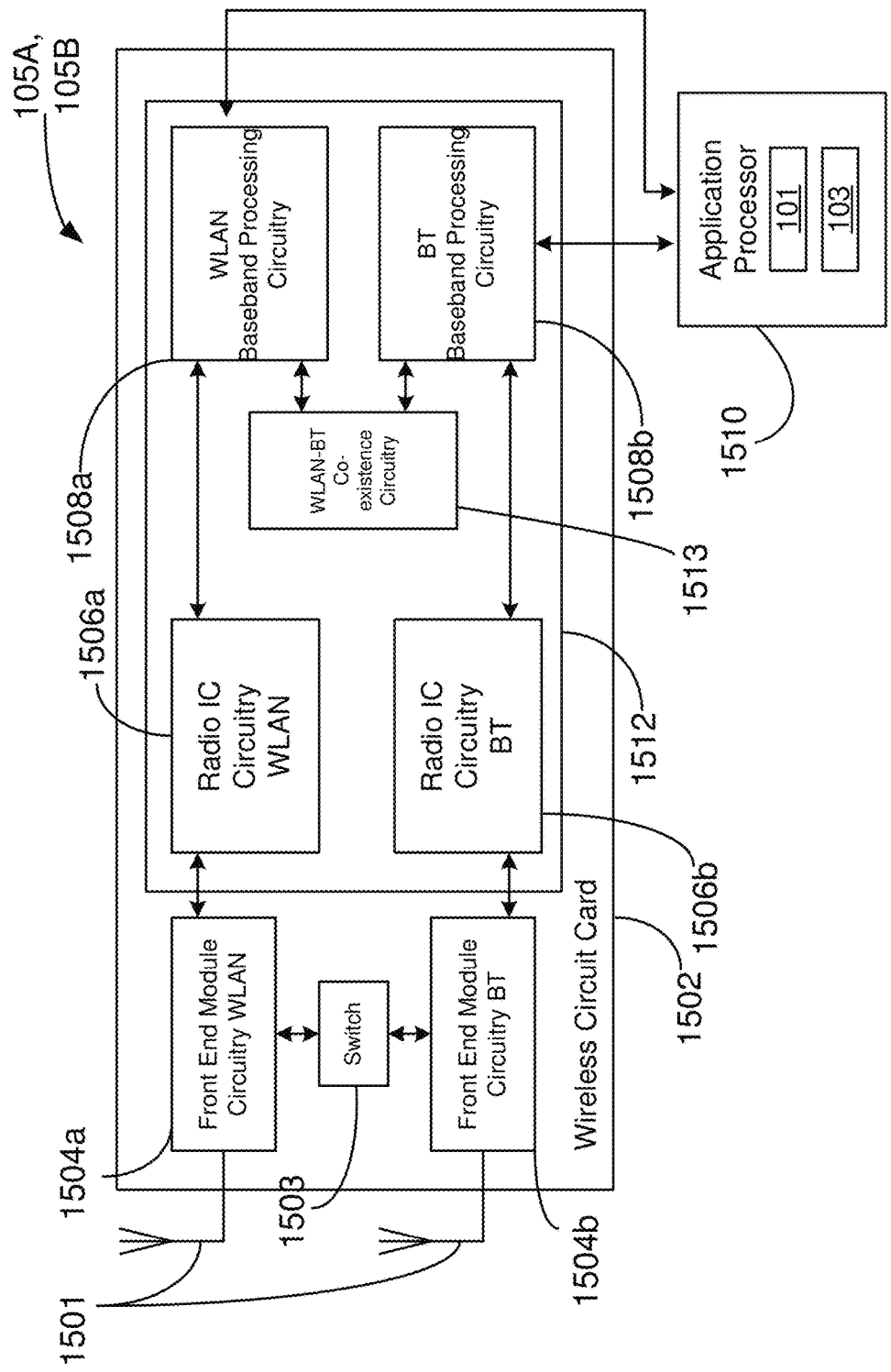
FIG. 15 is a block diagram of a radio architecture in accordance with some examples.

FIG. 15 is a block diagram of a radio architecture 105A, 105B in accordance with some embodiments that may be implemented in any one of the example AP 102 and/or the example user device 120 of FIG. 1. Radio architecture 105A, 105B may include radio front-end module (FEM) circuitry 1504a-b, radio IC circuitry 1506a-b and baseband processing circuitry 1508a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1504a-b may include a WLAN or Wi-Fi FEM circuitry 1504a and a Bluetooth (BT) FEM circuitry 1504b. The WLAN FEM circuitry 1504a may include a receive signal path comprising circuitry configured to operate on WLAN RF signals received from one or more antennas 1501, to amplify the received signals and to provide the amplified versions of the received signals to the WLAN radio IC circuitry 1506a for further processing. The BT FEM circuitry 1504b may include a receive signal path which may include circuitry configured to operate on BT RF signals received from one or more antennas 1501, to amplify the received signals and to provide the amplified versions of the received signals to the BT radio IC circuitry 1506b for further processing. FEM circuitry 1504a may also include a transmit signal path which may include circuitry configured to amplify WLAN signals provided by the radio IC circuitry 1506a for wireless transmission by one or more of the antennas 1501. In addition, FEM circuitry 1504b may also include a transmit signal path which may include circuitry configured to amplify BT signals provided by the radio IC circuitry 1506b for wireless transmission by the one or more antennas. In the embodiment of FIG. 15, although FEM 1504a and FEM 1504b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1506a-b as shown may include WLAN radio IC circuitry 1506a and BT radio IC circuitry 1506b. The WLAN radio IC circuitry 1506a may include a receive signal path which may include circuitry to down-convert WLAN RF signals received from the FEM circuitry 1504a and provide baseband signals to WLAN baseband processing circuitry 1508a. BT radio IC circuitry 1506b may in turn include a receive signal path which may include circuitry to down-convert BT RF signals received from the FEM circuitry 1504b and provide baseband signals to BT baseband processing circuitry 1508b. WLAN radio IC circuitry 1506a may also include a transmit signal path which may include circuitry to up-convert WLAN baseband signals provided by the WLAN baseband processing circuitry 1508a and provide WLAN RF output signals to the FEM circuitry 1504a for subsequent wireless transmission by the one or more antennas 1501. BT radio IC circuitry 1506b may also include a transmit signal path which may include circuitry to up-convert BT baseband signals provided by the BT baseband processing circuitry 1508b and provide BT RF output signals to the FEM circuitry 1504b for subsequent wireless transmission by the one or more antennas 1501. In the embodiment of FIG. 15, although radio IC circuitries 1506a and 1506b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1508a-b may include a WLAN baseband processing circuitry 1508a and a BT baseband processing circuitry 1508b. The WLAN baseband processing circuitry 1508a may include a memory, such as, for example, a set of RAM arrays in a Fast Fourier Transform or Inverse Fast Fourier Transform block (not shown) of the WLAN baseband processing circuitry 1508a. Each of the WLAN baseband circuitry 1508a and the BT baseband circuitry 1508b may further include one or more processors and control logic to process the signals received from the corresponding WLAN or BT receive signal path of the radio IC circuitry 1506a-b, and to also generate corresponding WLAN or BT baseband signals for the transmit signal path of the radio IC circuitry 1506a-b. Each of the baseband processing circuitries 1508a and 1508b may further include physical layer (PHY) and medium access control layer (MAC) circuitry, and may further interface with a device for generation and processing of the baseband signals and for controlling operations of the radio IC circuitry 1506a-b.

Referring still to FIG. 15, according to the shown embodiment, WLAN-BT coexistence circuitry 1513 may include logic providing an interface between the WLAN baseband circuitry 1508a and the BT baseband circuitry 1508b to enable use cases requiring WLAN and BT coexistence. In addition, a switch 1503 may be provided between the WLAN FEM circuitry 1504a and the BT FEM circuitry 1504b to allow switching between the WLAN and BT radios according to application needs. In addition, although the antennas 1501 are depicted as being respectively connected to the WLAN FEM circuitry 1504a and the BT FEM circuitry 1504b, embodiments include within their scope the sharing of one or more antennas as between the WLAN and BT FEMs, or the provision of more than one antenna connected to each of FEM 1504a or 1504b.

In some embodiments, the front-end module circuitry 1504a-b, the radio IC circuitry 1506a-b, and baseband processing circuitry 1508a-b may be provided on a single radio card, such as wireless radio card 1502. In some other embodiments, the one or more antennas 1501, the FEM circuitry 1504a-b and the radio IC circuitry 1506a-b may be provided on a single radio card. In some other embodiments, the radio IC circuitry 1506a-b and the baseband processing circuitry 1508a-b may be provided on a single chip or integrated circuit (IC), such as IC 1512.

In some embodiments, the wireless radio card 1502 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11 ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 1508b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 16:
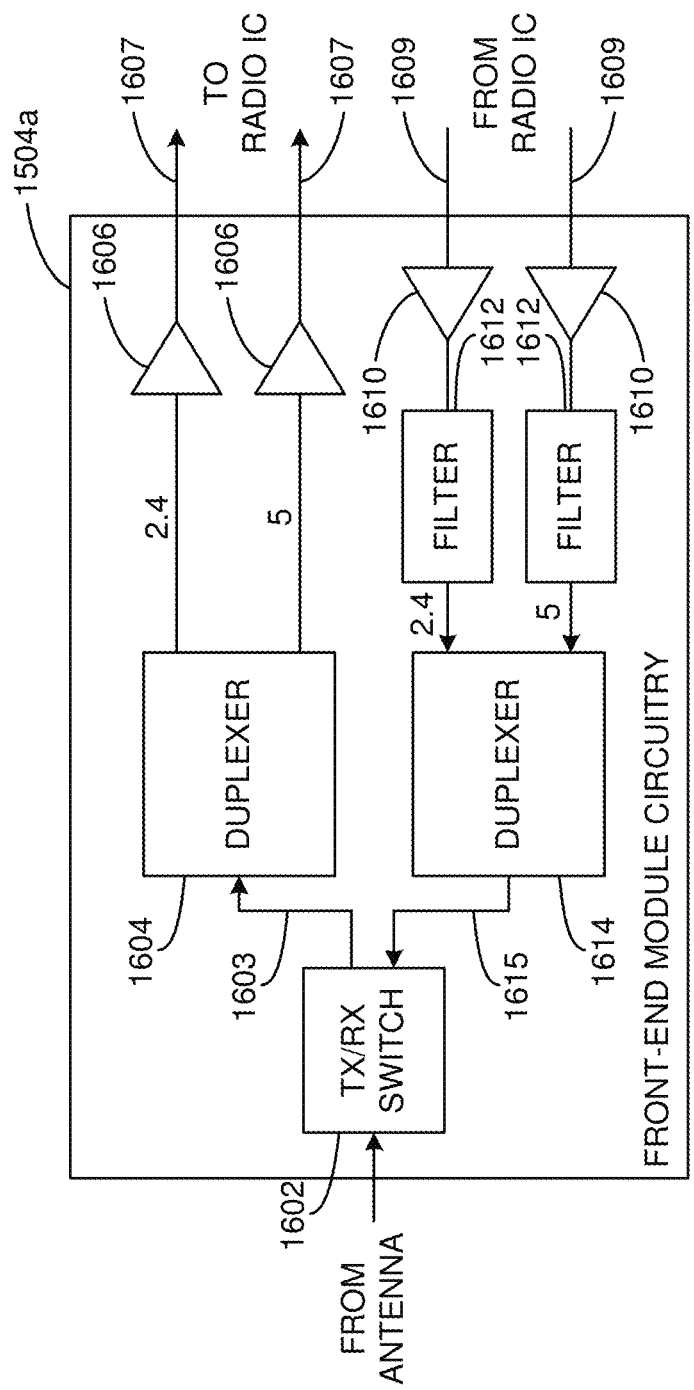
FIG. 16 illustrates an example front-end module circuitry for use in the radio architecture of FIG. 15, in accordance with one or more example embodiments of the present disclosure.

FIG. 16 illustrates WLAN FEM circuitry 1504a in accordance with some embodiments. Although the example of FIG. 16 is described in conjunction with the WLAN FEM circuitry 1504a, the example of FIG. 16 may be described in conjunction with the example BT FEM circuitry 1504b (FIG. 15), although other circuitry configurations may also be suitable.

In some embodiments, the FEM circuitry 1504a may include a TX/RX switch 1602 to switch between transmit mode and receive mode operation. The FEM circuitry 1504a may include a receive signal path and a transmit signal path. The receive signal path of the FEM circuitry 1504a may include a low-noise amplifier (LNA) 1606 to amplify received RF signals 1603 and provide the amplified received RF signals 1607 as an output (e.g., to the radio IC circuitry 1506a-b (FIG. 15)). The transmit signal path of the circuitry 1504a may include a power amplifier (PA) to amplify input RF signals 1609 (e.g., provided by the radio IC circuitry 1506a-b), and one or more filters 1612, such as band-pass filters (BPFs), low-pass filters (LPFs) or other types of filters, to generate RF signals 1615 for subsequent transmission (e.g., by one or more of the antennas 1501 (FIG. 15)) via an example duplexer 1614.

In some dual-mode embodiments for Wi-Fi communication, the FEM circuitry 1504a may be configured to operate in either the 2.4 GHz frequency spectrum or the 5 GHz frequency spectrum. In these embodiments, the receive signal path of the FEM circuitry 1504a may include a receive signal path duplexer 1604 to separate the signals from each spectrum as well as provide a separate LNA 1606 for each spectrum as shown. In these embodiments, the transmit signal path of the FEM circuitry 1504*a* may also include a power amplifier 1610 and a filter 1612, such as a BPF, an LPF or another type of filter for each frequency spectrum and a transmit signal path duplexer 1604 to provide the signals of one of the different spectrums onto a single transmit path for subsequent transmission by the one or more of the antennas 1501 (FIG. 15). In some embodiments, BT communications may utilize the 2.4 GHz signal paths and may utilize the same FEM circuitry 1504*a* as the one used for WLAN communications.

Figure 17:
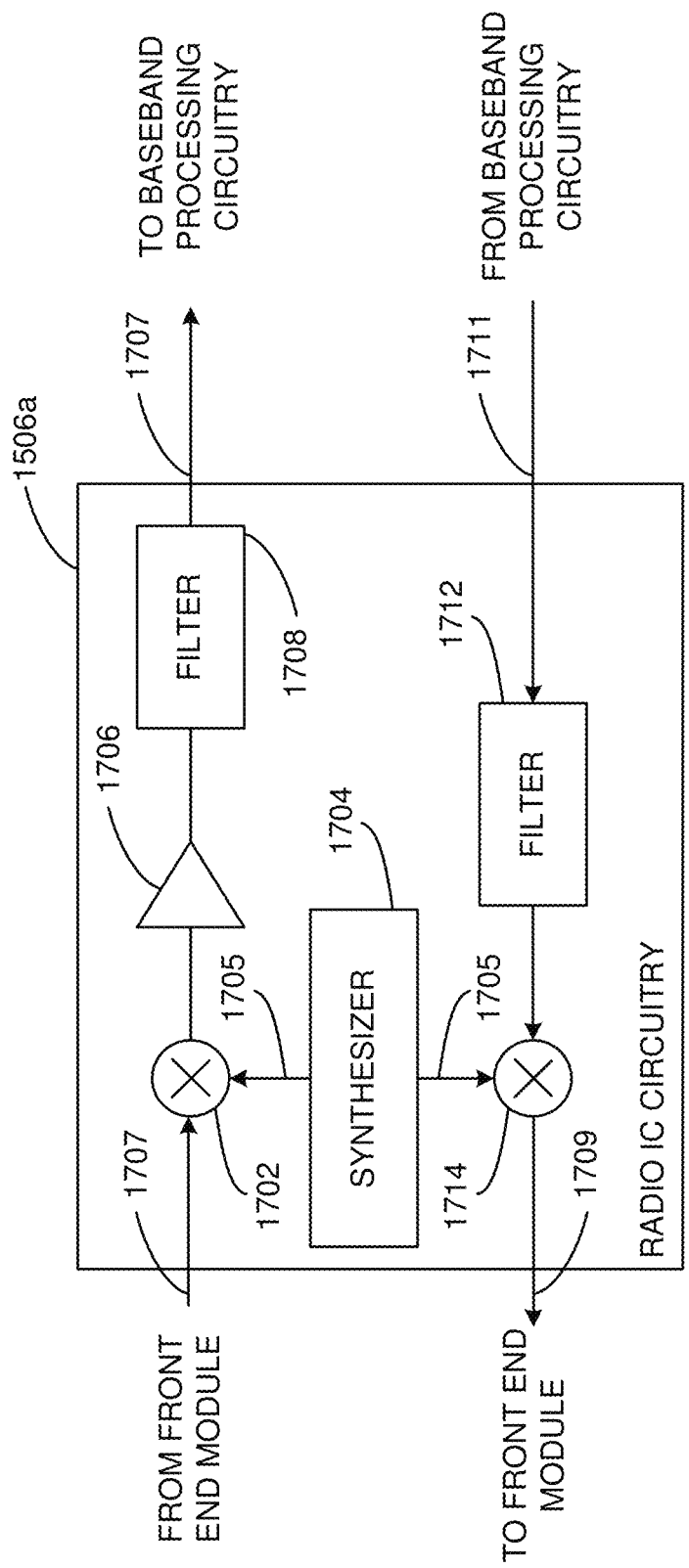
FIG. 17 illustrates an example radio IC circuitry for use in the radio architecture of FIG. 15, in accordance with one or more example embodiments of the present disclosure.

FIG. 17 illustrates radio IC circuitry 1506*a* in accordance with some embodiments. The radio IC circuitry 1506*a* is one example of circuitry that may be suitable for use as the WLAN or BT radio IC circuitry 1506*a*/1506*b* (FIG. 15), although other circuitry configurations may also be suitable. Alternatively, the example of FIG. 17 may be described in conjunction with the example BT radio IC circuitry 1506*b*.

In some embodiments, the radio IC circuitry 1506*a* may include a receive signal path and a transmit signal path. The receive signal path of the radio IC circuitry 1506*a* may include at least mixer circuitry 1702, such as, for example, down-conversion mixer circuitry, amplifier circuitry 1706 and filter circuitry 1708. The transmit signal path of the radio IC circuitry 1506*a* may include at least filter circuitry 1712 and mixer circuitry 1714, such as, for example, upconversion mixer circuitry. Radio IC circuitry 1506*a* may also include synthesizer circuitry 1704 for synthesizing a frequency 1705 for use by the mixer circuitry 1702 and the mixer circuitry 1714. The mixer circuitry 1702 and/or 1714 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 17 illustrates only a simplified version of a radio IC circuitry, and may include, although not shown, embodiments where each of the depicted circuitries may include more than one component. For instance, mixer circuitry 1714 may each include one or more mixers, and filter circuitries 1708 and/or 1712 may each include one or more filters, such as one or more BPFs and/or LPFs according to application needs. For example, when mixer circuitries are of the direct-conversion type, they may each include two or more mixers.

In some embodiments, mixer circuitry 1702 may be configured to down-convert RF signals 1607 received from the FEM circuitry 1504*a-b* (FIG. 15) based on the synthesized frequency 1705 provided by synthesizer circuitry 1704. The amplifier circuitry 1706 may be configured to amplify the down-converted signals and the filter circuitry 1708 may include an LPF configured to remove unwanted signals from the down-converted signals to generate output baseband signals 1707. Output baseband signals 1707 may be provided to the baseband processing circuitry 1508*a-b* (FIG. 15) for further processing. In some embodiments, the output baseband signals 1707 may be zero-frequency baseband signals, although this is not a requirement. In some embodiments, mixer circuitry 1702 may comprise passive mixers, although the scope of the embodiments is not limited in this respect.

In some embodiments, the mixer circuitry 1714 may be configured to up-convert input baseband signals 1711 based on the synthesized frequency 1705 provided by the synthesizer circuitry 1704 to generate RF output signals 1609 for the FEM circuitry 1504*a-b*. The baseband signals 1711 may be provided by the baseband processing circuitry 1508*a-b* and may be filtered by filter circuitry 1712. The filter circuitry 1712 may include an LPF or a BPF, although the scope of the embodiments is not limited in this respect.

In some embodiments, the mixer circuitry 1702 and the mixer circuitry 1714 may each include two or more mixers and may be arranged for quadrature down-conversion and/or upconversion respectively with the help of synthesizer 1704. In some embodiments, the mixer circuitry 1702 and the mixer circuitry 1714 may each include two or more mixers each configured for image rejection (e.g., Hartley image rejection). In some embodiments, the mixer circuitry 1702 and the mixer circuitry 1714 may be arranged for direct down-conversion and/or direct upconversion, respectively. In some embodiments, the mixer circuitry 1702 and the mixer circuitry 1714 may be configured for super-heterodyne operation, although this is not a requirement.

Mixer circuitry 1702 may comprise, according to one embodiment: quadrature passive mixers (e.g., for the in-phase (I) and quadrature phase (Q) paths). In such an embodiment, RF input signal 1607 from FIG. 17 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1705 of synthesizer 1704 (FIG. 17). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction in power consumption.

The RF input signal 1607 (FIG. 16) may comprise a balanced signal, although the scope of the embodiments is not limited in this respect. The I and Q baseband output signals may be provided to low-noise amplifier, such as amplifier circuitry 1706 (FIG. 17) or to filter circuitry 1708 (FIG. 17).

In some embodiments, the output baseband signals 1707 and the input baseband signals 1711 may be analog baseband signals, although the scope of the embodiments is not limited in this respect. In some alternate embodiments, the output baseband signals 1707 and the input baseband signals 1711 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1704 may be a fractional-N synthesizer or a fractional N/N+1 synthesizer, although the scope of the embodiments is not limited in this respect as other types of frequency synthesizers may be suitable. For example, synthesizer circuitry 1704 may be a delta-sigma synthesizer, a frequency multiplier, or a synthesizer comprising a phase-locked loop with a frequency divider. According to some embodiments, the synthesizer circuitry 1704 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1704 may be provided by a voltage controlled oscillator (VCO), although that is not a requirement. A divider control input may further be provided by either the baseband processing circuitry 1508*a-b* (FIG. 15) depending on the desired output frequency 1705. In some embodiments, a divider control input (e.g., N) may be determined from a look-up table (e.g., within a Wi-Fi card) based on a channel number and a channel center frequency as determined or indicated by the example application processor 1510. The application processor 1510 may include, or otherwise be connected to, one of the example secure signal converter 101 or the example received signal converter 103 (e.g., depending on which device the example radio architecture is implemented in).

In some embodiments, synthesizer circuitry 1704 may be configured to generate a carrier frequency as the output frequency 1705, while in other embodiments, the output frequency 1705 may be a fraction of the carrier frequency (e.g., one-half the carrier frequency, one-third the carrier frequency). In some embodiments, the output frequency 1705 may be a LO frequency (fLO).

Figure 18:
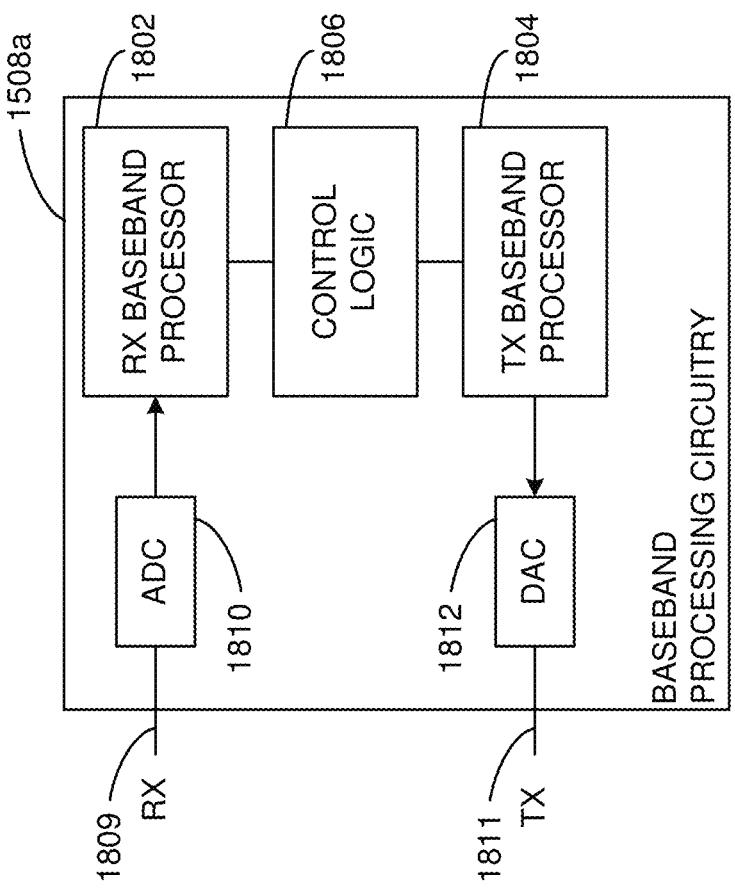
FIG. 18 illustrates an example baseband processing circuitry for use in the radio architecture of FIG. 15, in accordance with one or more example embodiments of the present disclosure.

FIG. 18 illustrates a functional block diagram of baseband processing circuitry 1508*a* in accordance with some embodiments. The baseband processing circuitry 1508*a* is one example of circuitry that may be suitable for use as the baseband processing circuitry 1508*a* (FIG. 15), although other circuitry configurations may also be suitable. Alternatively, the example of FIG. 17 may be used to implement the example BT baseband processing circuitry 1508*b* of FIG. 15.

The baseband processing circuitry 1508*a* may include a receive baseband processor (RX BBP) 1802 for processing receive baseband signals 1709 provided by the radio IC circuitry 1506*a-b* (FIG. 15) and a transmit baseband processor (TX BBP) 1804 for generating transmit baseband signals 1711 for the radio IC circuitry 1506*a-b*. The baseband processing circuitry 1508*a* may also include control logic 1806 for coordinating the operations of the baseband processing circuitry 1508*a*.

In some embodiments (e.g., when analog baseband signals are exchanged between the baseband processing circuitry 1508*a-b* and the radio IC circuitry 1506*a-b*), the baseband processing circuitry 1508*a* may include ADC 1810 to convert analog baseband signals 1809 received from the radio IC circuitry 1506*a-b* to digital baseband signals for processing by the RX BBP 1802. In these embodiments, the baseband processing circuitry 1508*a* may also include DAC 1812 to convert digital baseband signals from the TX BBP 1804 to analog baseband signals 1811.

In some embodiments that communicate OFDM signals or OFDMA signals, such as through baseband processor 1508*a*, the transmit baseband processor 1804 may be configured to generate OFDM or OFDMA signals as appropriate for transmission by performing an inverse fast Fourier transform (IFFT). The receive baseband processor 1802 may be configured to process received OFDM signals or OFDMA signals by performing an FFT. In some embodiments, the receive baseband processor 1802 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 15, in some embodiments, the antennas 1501 (FIG. 15) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1501 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: determine one or more medium access control (MAC) protocol data unit (MPDUs) to be sent to a first station device of one or more station devices, wherein the one or more MAC protocol data units (MPDUs) comprise a first MPDU; segment the first MPDU into a plurality of segments, wherein the one or more segments include a first segment and a second segment; cause to send the plurality of segments to the first station device; identify a feedback frame received from the first station device, wherein the feedback frame comprises error information associated with the plurality of segments; and cause to retransmit at least one of the plurality of segments based on the error information.

Example 2 may include the device of example 1 and/or some other example herein, wherein the processing circuitry may be further configured to cause to send an indication associated with the hybrid automatic repeat request (HARQ), wherein the indication indicates to the first station device that a transmission of the plurality of segments may be for HARQ and indicates to the first station device whether to store a failed segment of the plurality of segments.

Example 3 may include the device of example 1 and/or some other example herein, wherein the feedback frame indicates that at least one of the plurality of segments has failed at the first station.

Example 4 may include the device of example 1 and/or some other example herein, wherein the feedback frame may be an hybrid automatic repeat request (HARQ) block acknowledgment frame.

Example 5 may include the device of example 1 and/or some other example herein, wherein the error information comprises a retransmit bid that may be set to 0 or 1 based on whether retransmission may be needed.

Example 6 may include the device of example 1 and/or some other example herein, wherein the processing circuitry may be further configured to determine the retransmission bit may be set to 1 indicating a retransmission of the at least one of the plurality of segments may be needed.

Example 7 may include the device of example 1 and/or some other example herein, wherein the processing circuitry may be further configured to identify a hybrid automatic repeat request (HARQ) segment bitmap included in the feedback frame.

Example 8 may include the device of example 1 and/or some other example herein, wherein the processing circuitry may be further configured to determine the first segment needs retransmission based on a corresponding bit in the bitmap being set to 1.

Example 9 may include the device of example 1 and/or some other example herein, wherein the processing circuitry may be further configured to determine the second segment does not retransmission based on a corresponding bit in the bitmap being set to 0.

Example 10 may include a non-transitory computer-readable medium storing computer-executable instructions which when executed by one or more processors result in performing operations comprising: determining one or more medium access control (MAC) protocol data unit (MPDUs) to be sent to a first station device of one or more station devices, wherein the one or more MAC protocol data units (MPDUs) comprise a first MPDU; segmenting the first MPDU into a plurality of segments, wherein the one or more segments include a first segment and a second segment; causing to send the plurality of segments to the first station device; identifying a feedback frame received from the first station device, wherein the feedback frame comprises error information associated with the plurality of segments; and causing to retransmit at least one of the plurality of segments based on the error information.

Example 11 may include the non-transitory computer-readable medium of example 10 and/or some other example herein, wherein the operations further comprise causing to send an indication associated with the hybrid automatic repeat request (HARQ), wherein the indication indicates to the first station device that a transmission of the plurality of segments may be for HARQ and indicates to the first station device whether to store a failed segment of the plurality of segments.

Example 12 may include the non-transitory computer-readable medium of example 10 and/or some other example herein, wherein the feedback frame indicates that at least one of the plurality of segments has failed at the first station.

Example 13 may include the non-transitory computer-readable medium of example 10 and/or some other example herein, wherein the feedback frame may be an hybrid automatic repeat request (HARQ) block acknowledgment frame.

Example 14 may include the non-transitory computer-readable medium of example 10 and/or some other example herein, wherein the error information comprises a retransmit bid that may be set to 0 or 1 based on whether retransmission may be needed.

Example 15 may include the non-transitory computer-readable medium of example 10 and/or some other example herein, wherein the operations further comprise determining the retransmission bit may be set to 1 indicating a retransmission of the at least one of the plurality of segments may be needed.

Example 16 may include the non-transitory computer-readable medium of example 10 and/or some other example herein, wherein the operations further comprise identifying a hybrid automatic repeat request (HARQ) segment bitmap included in the feedback frame.

Example 17 may include the non-transitory computer-readable medium of example 10 and/or some other example herein, wherein the operations further comprise determining the first segment needs retransmission based on a corresponding bit in the bitmap being set to 1.

Example 18 may include the non-transitory computer-readable medium of example 10 and/or some other example herein, wherein the operations further comprise determining the second segment does not retransmission based on a corresponding bit in the bitmap being set to 0.

Example 19 may include a method comprising: determining, by one or more processors, one or more medium access control (MAC) protocol data unit (MPDUs) to be sent to a first station device of one or more station devices, wherein the one or more MAC protocol data units (MPDUs) comprise a first MPDU; segmenting the first MPDU into a plurality of segments, wherein the one or more segments include a first segment and a second segment; causing to send the plurality of segments to the first station device; identifying a feedback frame received from the first station device, wherein the feedback frame comprises error information associated with the plurality of segments; and causing to retransmit at least one of the plurality of segments based on the error information.

Example 20 may include the method of example 19 and/or some other example herein, further comprising causing to send an indication associated with the hybrid automatic repeat request (HARQ), wherein the indication indicates to the first station device that a transmission of the plurality of segments may be for HARQ and indicates to the first station device whether to store a failed segment of the plurality of segments.

Example 21 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 22 may include an apparatus comprising logic, modules, and/or circuitry to perform one or more elements of a method described in or related to any of examples 1-20, or any other method or process described herein.

Example 23 may include a method, technique, or process as described in or related to any of examples 1-20, or portions or parts thereof.

Example 24 may include an apparatus comprising: one or more processors and one or more computer readable media comprising instructions that, when executed by the one or more processors, cause the one or more processors to perform the method, techniques, or process as described in or related to any of examples 1-20, or portions thereof.

Example 25 may include a method of communicating in a wireless network as shown and described herein.

Example 26 may include a system for providing wireless communication as shown and described herein.

Example 27 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
   determine one or more medium access control (MAC) protocol data unit (MPDUs) to be sent to a first station device of one or more station devices, wherein the one or more MAC protocol data units (MPDUs) comprise a first MPDU;
   segment the first MPDU into a plurality of segments, wherein the one or more segments include a first segment and a second segment;
   cause to send the plurality of segments to the first station device;
   identify a feedback frame received from the first station device, wherein the feedback frame comprises error information associated with the plurality of segments, wherein unsuccessfully decoded segments are stored in a sequential order in a physical layer (PHY) buffer of the first station device, and wherein successfully decoded segments are stored in a different buffer of the first station device; and
   cause to retransmit at least one of the plurality of segments based on the error information.

2. The device of claim 1, wherein the processing circuitry is further configured to cause to send an indication associated with the hybrid automatic repeat request (HARQ), wherein the indication indicates to the first station device that a transmission of the plurality of segments is for HARQ and indicates to the first station device whether to store a failed segment of the plurality of segments.

3. The device of claim 1, wherein the feedback frame indicates that at least one of the plurality of segments has failed at the first station.

4. The device of claim 1, wherein the feedback frame is an hybrid automatic repeat request (HARQ) block acknowledgment frame.

5. The device of claim 1, wherein the error information comprises a retransmit bit that is set to 0 or 1 based on whether retransmission is needed.

6. The device of claim 5, wherein the processing circuitry is further configured to determine the retransmit bit is set to 1 indicating a retransmission of the at least one of the plurality of segments is needed.

7. The device of claim 1, wherein the processing circuitry is further configured to identify a hybrid automatic repeat request (HARQ) segment bitmap included in the feedback frame.

8. The device of claim 7, wherein the processing circuitry is further configured to determine the first segment needs retransmission based on a corresponding bit in the HARQ segment bitmap being set to 1.

9. The device of claim 7, wherein the processing circuitry is further configured to determine the second segment does not retransmission based on a corresponding bit in the HARQ segment bitmap being set to 0.

10. A non-transitory computer-readable medium storing computer-executable instructions which when executed by one or more processors result in performing operations comprising:
    determining one or more medium access control (MAC) protocol data units (MPDUs) to be sent to a first station device of one or more station devices, wherein the one or more MAC protocol data units (MPDUs) comprise a first MPDU;

segmenting the first MPDU into a plurality of segments, wherein the one or more segments include a first segment and a second segment;

causing to send the plurality of segments to the first station device;

identifying a feedback frame received from the first station device, wherein the feedback frame comprises error information associated with the plurality of segments, wherein unsuccessfully decoded segments are stored in a sequential order in a physical layer (PHY) buffer of the first station device, and wherein successfully decoded segments are stored in a different buffer of the first station device; and causing to retransmit at least one of the plurality of segments based on the error information.

11. The non-transitory computer-readable medium of claim 10, wherein the operations further comprise causing to send an indication associated with the hybrid automatic repeat request (HARQ), wherein the indication indicates to the first station device that a transmission of the plurality of segments is for HARQ and indicates to the first station device whether to store a failed segment of the plurality of segments.

12. The non-transitory computer-readable medium of claim 10, wherein the feedback frame indicates that at least one of the plurality of segments has failed at the first station.

13. The non-transitory computer-readable medium of claim 10, wherein the feedback frame is an hybrid automatic repeat request (HARQ) block acknowledgment frame.

14. The non-transitory computer-readable medium of claim 10, wherein the error information comprises a retransmit bit that is set to 0 or 1 based on whether retransmission is needed.

15. The non-transitory computer-readable medium of claim 14, wherein the operations further comprise determining the retransmit bit is set to indicating a retransmission of the at least one of the plurality of segments is needed.

16. The non-transitory computer-readable medium of claim 10, wherein the operations further comprise identifying a hybrid automatic repeat request (HARQ) segment bitmap included in the feedback frame.

17. The non-transitory computer-readable medium of claim 16, wherein the operations further comprise determining the first segment needs retransmission based on a corresponding bit in the HARQ segment bitmap being set to 1.

18. The non-transitory computer-readable medium of claim 16, wherein the operations further comprise determining the second segment does not retransmission based on a corresponding bit in the HARQ segment bitmap being set to 0.

19. A method comprising:

determining, by one or more processors, one or more medium access control (MAC) protocol data unit (MPDUs) to be sent to a first station device of one or more station devices, wherein the one or more MAC protocol data units (MPDUs) comprise a first MPDU;

segmenting the first MPDU into a plurality of segments, wherein the one or more segments include a first segment and a second segment;

causing to send the plurality of segments to the first station device;

identifying a feedback frame received from the first station device, wherein the feedback frame comprises error information associated with the plurality of segments, wherein unsuccessfully decoded segments are stored in a sequential order in a physical layer (PHY) buffer of the first station device, and wherein successfully decoded segments are stored in a different buffer of the first station device; and causing to retransmit at least one of the plurality of segments based on the error information.

20. The method of claim 19, further comprising causing to send an indication associated with the hybrid automatic repeat request (HARQ), wherein the indication indicates to the first station device that a transmission of the plurality of segments is for HARQ and indicates to the first station device whether to store a failed segment of the plurality of segments.

\* \* \* \* \*